United States Patent [19]

Nering et al.

[11] Patent Number: 4,658,250

[45] Date of Patent: Apr. 14, 1987

[54] COMPUTER NETWORK OPERATING METHOD AND APPARATUS FOR DETECTING AND EXPLOITING DATA COLLISIONS TO MERGE READ TRANSACTIONS

[76] Inventors: Douglas G. Nering, 572 W. Pima Ave., Coolidge, Ariz. 85228; James L. Bucanek, P.O. Box 5741, Scottsdale, Ariz. 85261

[21] Appl. No.: 621,070

[22] Filed: Jun. 15, 1984

[51] Int. Cl.[4] .............................................. H04Q 9/00
[52] U.S. Cl. ................................... 340/825.5; 370/85
[58] Field of Search ........... 340/825.5, 825.05, 825.51; 370/85, 94

[56] References Cited

U.S. PATENT DOCUMENTS

| | | | |
|---|---|---|---|
| 4,058,681 | 11/1977 | Imaizume et al. | 370/85 |
| 4,410,983 | 10/1983 | Cope | 370/85 |
| 4,463,351 | 7/1984 | Chiarottino | 340/825.5 |
| 4,511,895 | 4/1985 | Miller et al. | 340/825.5 |
| 4,564,838 | 1/1986 | Boulogne et al. | 340/825.5 |
| 4,569,046 | 2/1986 | Hadziomerovic et al. | 370/85 |

Primary Examiner—Donald J. Yusko
Attorney, Agent, or Firm—Cahill, Sutton & Thomas

[57] ABSTRACT

In a computer network including a plurality of processors coupled to a data bus, ones of the processors contending for the data bus to output data requests each output priority byes of their transmission header packets as a series of data bits. Every contending processor sequentially reads data present on the data bus. Each processor that reads a "one" on the bus corresponding to a "zero" output by that processor interprets this as a data collision yields the bus for data transmission purposes, but continues to read all data appearing on the data bus and compares it with corresponding bits of its own transmission header packet. Only the processor having highest priority detects no data collision, and continues to output its data request. If any other contending processor determines that the data request of the highest priority processor is identical or sufficiently similar to its own, it merges its request with that of the highest priority processor by reading the resulting data, thereby reducing waiting time especially in file-intensive operations.

17 Claims, 11 Drawing Figures

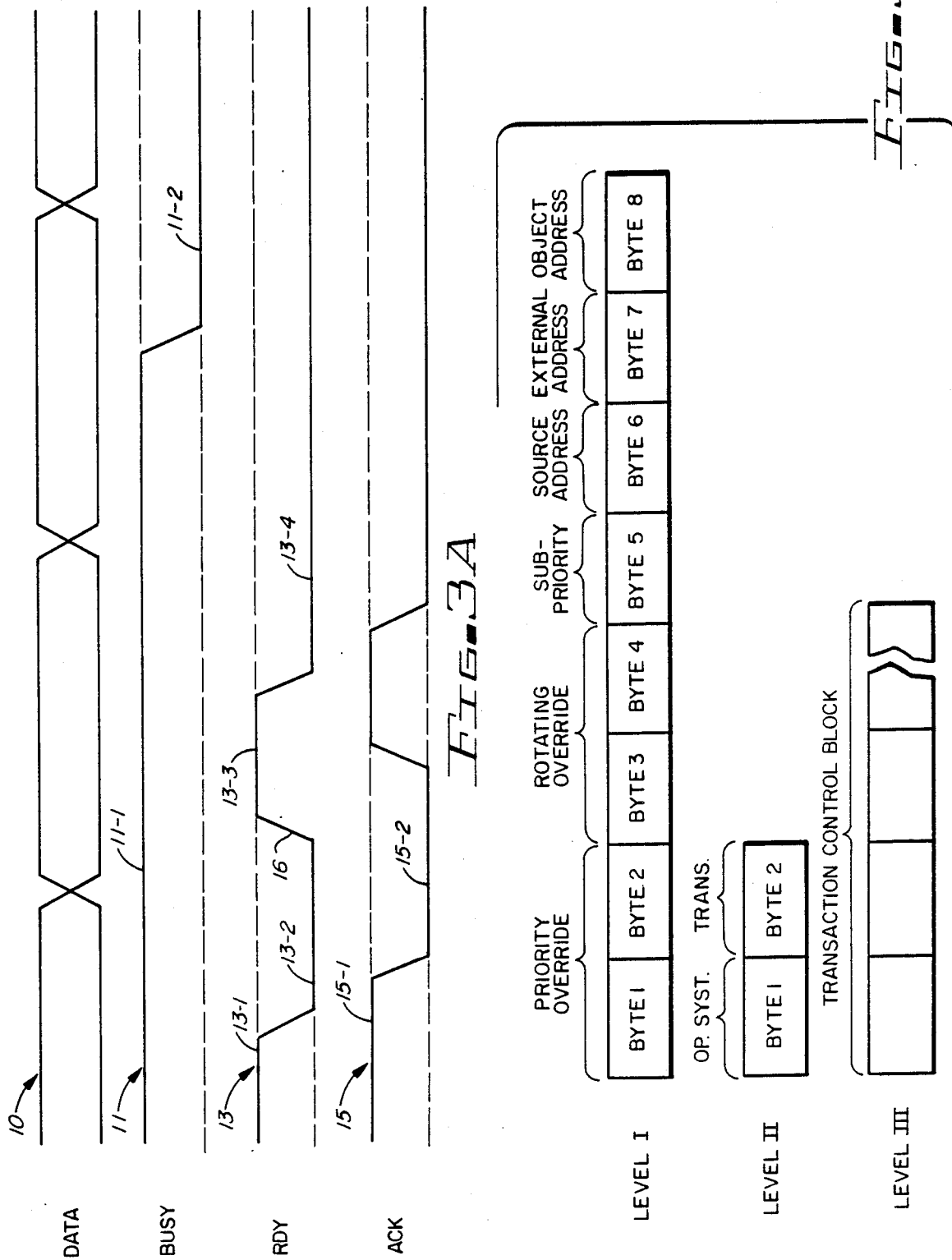

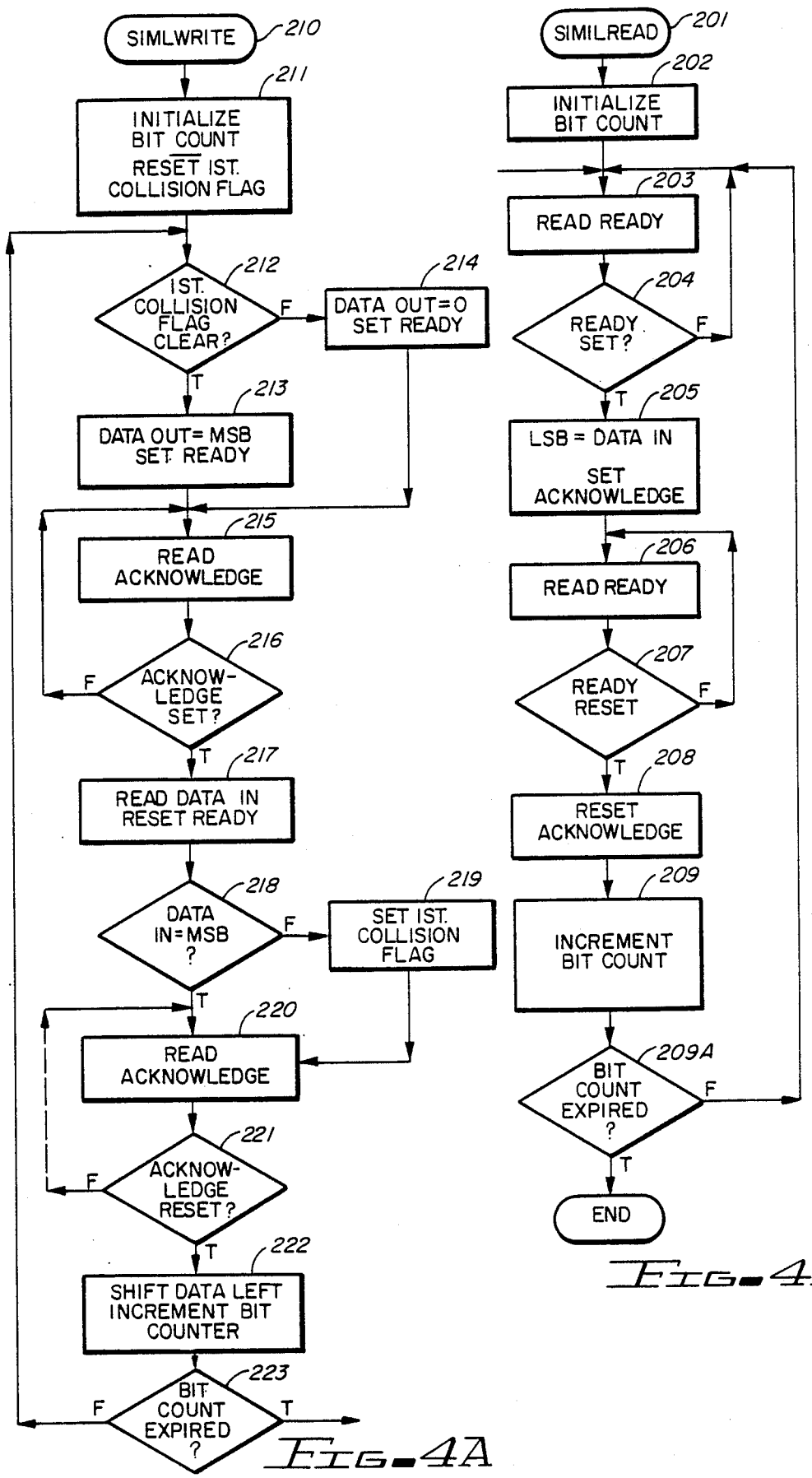

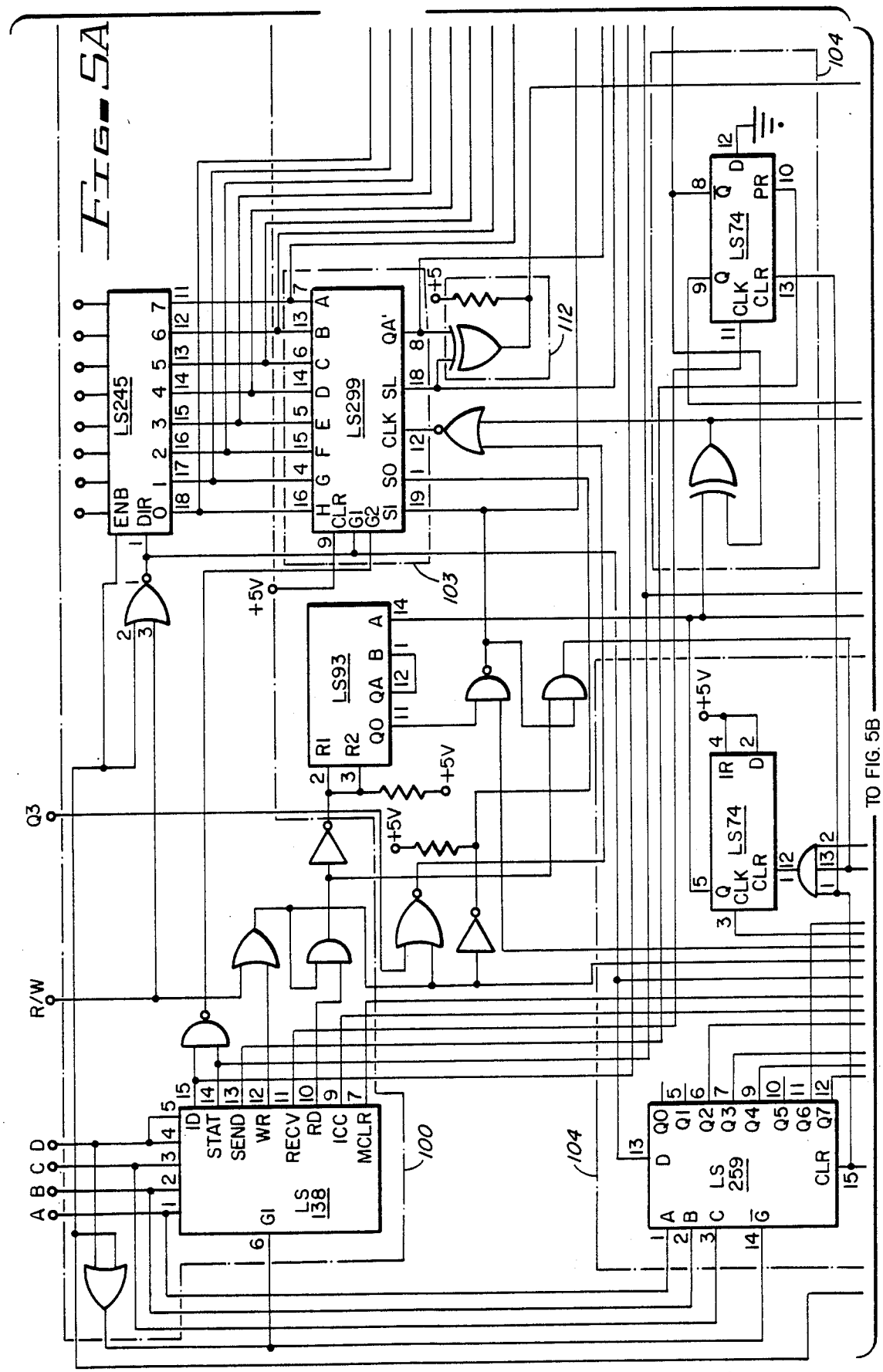

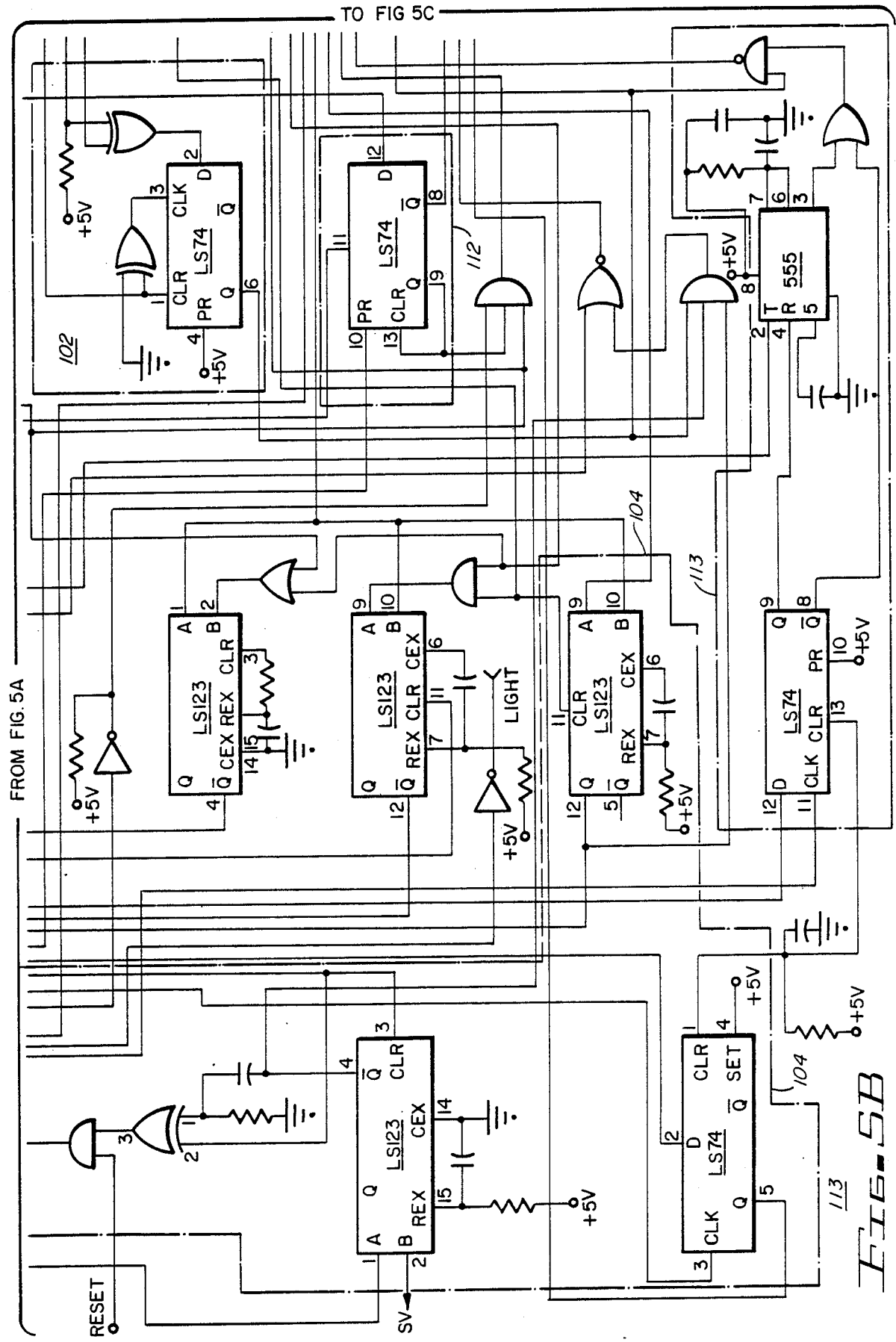

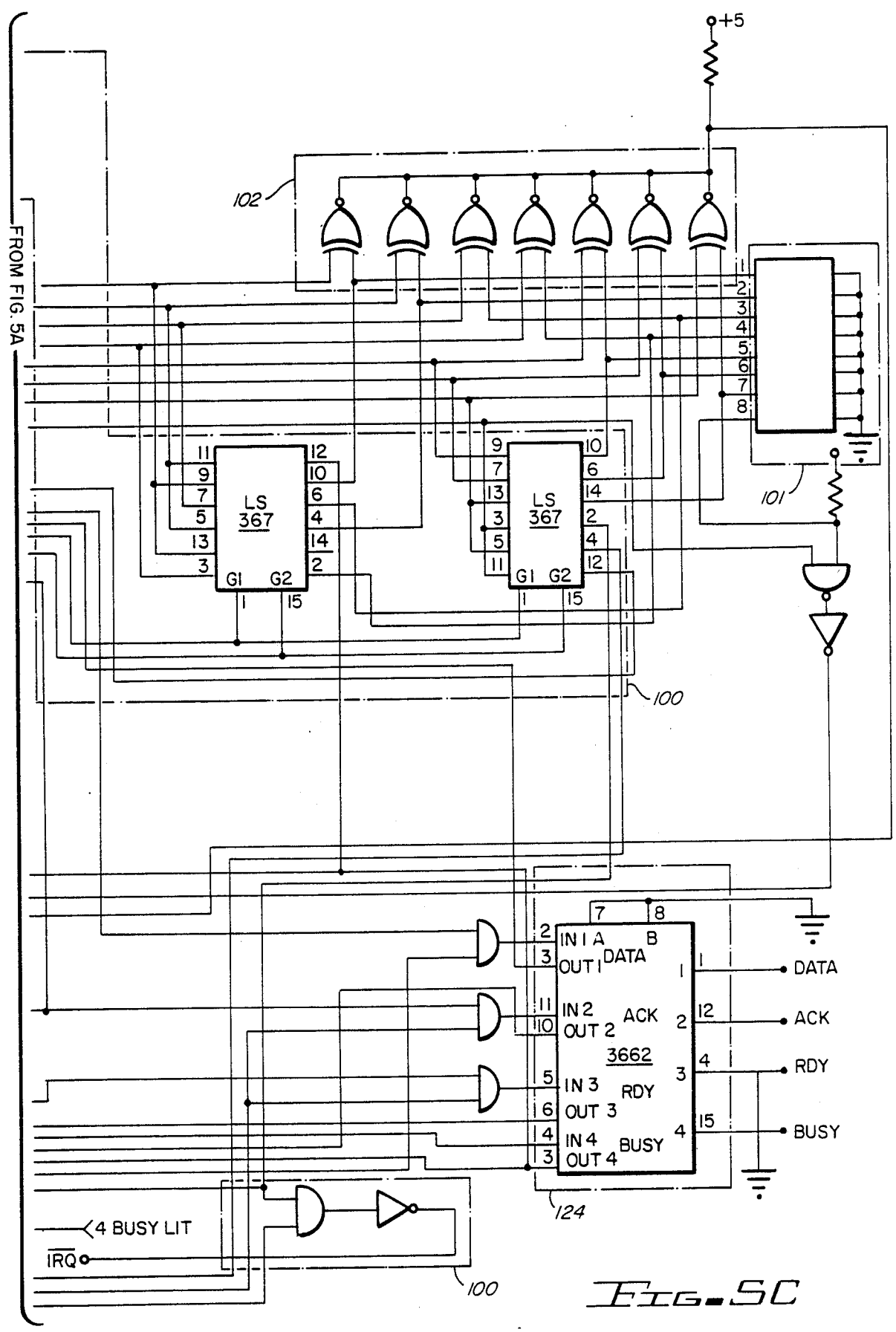

COMPUTER NETWORK OPERATING METHOD AND APPARATUS FOR DETECTING AND EXPLOITING DATA COLLISIONS TO MERGE READ TRANSACTIONS

BACKGROUND OF THE INVENTION

The invention relates to computer networks, and especially to methods and apparatus for reducing the amounts of time that the various processors connected to the network have to spend waiting for access to the data bus and to various peripheral devices attached thereto.

As personal computers have decreased in price and increased in data processing capability, they have become widely used to meet the needs of serious professional, business, and educational users. In order to use low cost personal computers in such professional, business, and educational environments, computer networks have been used to link personal computers in a multi-user, multi-function system that shares mass storage, communication facilities and printers and yet allows each individual user to have his own work station. Such local networks typically include use of high bandwidth transmission cables for communication over rather long distances without significant deterioration of signals, as typified by the ERTHERNET system, where the host processors all listen to one data bus into which they transmit their messages, one host at a time. Another local network topology is typified by the RINGNET system in which all of the processors are connected directly to their immediately adjacent neighbors. In local networks such as the ETHERNET, more than one processor may attempt to transmit whenever the data bus is not busy, and as a result, "collision" of data signals occurs on the bus data. Such a data collision is detected by special analog circuitry associated with each processor, and when such a data collision is detected, it is considered to be "fatal". Each contending processor then "backs off" for a random amount of time before attempting to transmit again. When relatively few processors connected to the local network attempt to gain access to the data bus, access can be gained almost immediately. However, when "traffic" on the data bus is heavy, a great deal of time may be wasted retrying to avoid collisions, thereby increasing the average transmission delay and decreasing system throughout. For more background, see "Computer Networks" by Andrew S. Tanenbaum. Also see the article "Distributed Broadcast Channel Access" by A. K. Mok and Steve Ward, Computer Networks 3 (1979) pages 327–335.

The foregoing Mok and Ward article suggests a computer network system in which, at the end of a data transmission, each of the processors waiting for access to the bus has a distinct priority which is encoded in a binary representation. Each bus transmits its encoded priority onto the data bus. Conductors of the data bus are logically ORed. Each processor reads the information on the data bus and compares that information with its own priority. Because of the wire ORed gating configuration of the data bus, the logical "ones" override logical "zeros", and the priority code of the highest priority contending processor is the priority code that will appear on the data bus. The "losing" processors all recognize this and withdraw. The "winning" (i.e., highest priority) processor now has control of the data bus and continues its transmission. Each losing processor increments its priority code and the winning processor resets its priority code to the lowest priority level, resulting in roughly "linear" waiting times. This bus conflict resolution scheme avoids the long waiting period that can result in other local networking bus conflict resolution techniques if traffic is heavy on the bus.

However, in local network systems, many of the transactions are for the purpose of retrieving files from mass storage. These are very time-consuming operations frequently involving considerable "overhead" delay for search and location of data, and transmission of a great deal of data along the data bus, therefore resulting in very long waiting times if the bus traffic is heavy. It would be desirable to have a technique that, on the average, reduces the waiting times in local networks wherein transactions are file-intensive and there is a great deal of contention for the data bus.

Accordingly, it is an object of the invention to provide an improved computing method and apparatus for reducing the amount of waiting that individual processors connected to the network must undergo in order to obtain access to the data bus and/or associated storage devices and/or associated peripheral devices.

It is another object of the invention to provide an improved local computer networking method and apparatus which is very inexpensive and reduces the waiting times for access to the bus.

It is another object of the invention to provide a computer networking apparatus and method which allows processors that fail to gain access to the bus during a particular bus arbitration transaction to continue to monitor the data bus and obtain the benefit of information transmitted by the winning processor.

It is another object of the invention to provide a local computer networking apparatus and method which provides increased data management flexibility and reduced average waiting times for processors to gain access to the data bus at times when there is a high level of contention for the data bus.

Most, if not all of the known local computer networking systems are either very expensive systems requiring expensive wiring and bus arbitration circuitry, or else they are very slow systems which have limited performance capability.

Accordingly, it is an object of the invention to provide an improved local computer networking apparatus and method which provides both very low cost to the user and yet improves the data throughput rate over the minimum cost, minimum performance systems that are presently available.

SUMMARY OF THE INVENTION

Briefly described and in accordance with one embodiment thereof, the invention provides a computer network apparatus and method for resolving bus contention conflicts by causing each processor needing to transmit a request to initially transmit a priority code onto a "wire-ORed type" of data bus, wherein each processor connected to the network is coupled in a logically ORed fashion to the bus, and by causing each contending processor to read each data item on the bus before any processor transmits more data on the bus, to compare the data read on the bus with the data transmitted by that processor on the bus, to determine if there has been a "data collision" of its output priority data with the priority data then actually appearing on the bus and, if that processor detects a data collision, then to go into a passive mode wherein that processor continues to read data on the bus conductor and compare the read data with corresponding portions of its own request to determine if its own request is mergeable with the request of the "winning" or highest priority processor.

In the described embodiment of the invention the data bus includes only one bi-directional conductor on which priority data, transaction request data, command data and other data is conducted in serial format. The network includes a "busy" signal conductor for indicating when a transaction is taking place on the data bus and a pair of "handshaking" conductors for indicating the level of a ready signal and an acknowledge signal. The ready signal indicates when data on the data bus is to be interpreted as valid. The acknowledge signal indicates when all processors that are contending for access to the data line are in a passive "bus monitoring mode" have read the valid data bit presently on the data bus. The data bus, busy, ready and acknowledge signal conductors each are connected or coupled to all processors in the computer network in a "wire ORed fashion" so that any processor can output a logical "one" level to a respective one of those conductors and if no other processor is pulling a particular one of these conductors to a logical "zero" level, a logical "one" will appear on that conductor. (Those skilled in the art recognize that the concept of logically ORing can apply to eigher positive or negative logic level definitions, and the term "logically ORed" as used herein encompasses either the positive or negative logic definitions. For example, for positive logic definitions, the logical OR of A and B is a "1" if either of them is a "1", and for negative logic definitions, the logical OR of A and B is a "0" if either of them is a "0".

Initially, when the busy (bus busy) signal indicates that the data bus is now available because no transaction is presently occurring on it, all local processors (i.e., processors coupled to the data bus, bus busy and handshaking conductors) waiting or "contending" for a turn to transmit requests via the data bus then transmit a transmission header packet of data that includes a binary priority code and several other codes including a source address which is the address of that processor, a destination address which is the address of the destination of the request that the processor needs to send, and a control block that specifies the transaction requested by that processor (including the needed operating system for that transaction). Each processor waiting to transmit on the data bus applies a logical "zero" to the ready signal conductor, and after a suitable delay, each receiving processor applies a logical "zero" to the acknowledge signal conductor. Each contending processor then outputs the most significant bit of its priority code onto the data bus. If any of the contending processors outputs, a logical "zero" a logical "zero" appears on the "wire ORed" data bus, but if all contending processors output a logical "one", a logical "one" then appears on the data bus. After all of the contending processors have output the most significant bits of their respective priority codes on the data bus, the last processor to do so releases the wire ORed ready signal conductor, which then goes to a logical "one" to indicate that the data presently on the data bus now can be considered to be valid. In response to this, each contending processor then reads the data presently on the data bus and then compares that data with the data which that processor last output onto the data bus. If the data presently on the data bus is identical to the data last output by that processor, that processor remains eligible to transmit another bit on the data bus. However, if the data presently on the data bus and read by the subject processor is not identical to that which the subject processor last output onto the data bus, then this mismatch is interpreted by the subject processor as a "data collision", and the subject processor does not have the highest priority code of any of the contending processors. The subject processor therefore is a "losing" processor in that it is no longer eligible to transmit another bit on the data bus. However, each losing processor continues to read and acknowledge in accordance with the handshaking procedure.

The foregoing procedure is repeated until all bits of the priority code have been transmitted on the data bus. At this point, only one of the contending processors, namely the one having the priority code with the highest binary value, has detected no data collisions and hence, remains eligible to transmit further bits of data on the data bus; that processor is the "winning" processor, and all of the remaining contending processors are "losing" processors. The winning processor continues to transmit the rest of its transmission header packet onto the data bus in accordance with the foregoing handshaking procedure. All losing processors, at least initially, go into a "passive" mode wherein they continue to read valid data output onto the data bus by the winning processor and compare that data with their own respective requests as long as the request transmitted by the winning processor is identical to the request of each particular losing processor. Such a losing processor continues its read and compare process to thereby determine if the data being requested by the winning processor includes the data specified by the request of that losing processor. If a particular losing processor determines that the data request by the winning processor is identical to or contains the data requested by that losing processor, that losing processor makes a determination that its request can be "merged" with the request of the winning processor. However, any time that a losing processor determines that its request cannot be merged with the request of the winning processor, that losing processor stops reading the data appearing on the data bus. The winning processor resets its priority code to a low value or otherwise adjusts its priority code in accordance with a suitable priority subroutine. (For example, the winning processor may execute a priority subroutine that allows it to maintain its high priority for a particular amount of computer time, so that it does not have to go to the "back of the line" each time it gains access to the data bus for a very short transaction). Each losing processor increments its priority code or otherwise adjusts its priority code. Each losing processor that succeeds in merging its request with the request transmitted by the winning processor resets its priority to a low value or otherwise adjusts its priority in accordance with a suitable priority subroutine. Each losing processor that merges its request with the request of the winning processor either determines that its request is identical to that of the winning processor or that the data requested by the losing processor is a subset of the data requested by the winning processor. In the latter case, that losing processor rejects the portion of the data appearing on the data bus in response to the request of the winning processor that is not within the subset defined by the losing processor's request.

In the described embodiments of the invention, all processors connected as local processors of the computer network execute the same software subroutines to effectuate the foregoing collision detection and passive bus monitoring and execute comparison operations. In one preferred described embodiment, all processors connected to the network have connected thereto a printed circuit interface circuit board that facilitates decoding and recognition of addresses received on the data bus and comparison of data appearing on the data bus which the priority code of that processor's request, for indicating data collision detection, and for effectuating the handshake synchronization of read and write operations. In another embodiment of the invention, most of the functions of the above interface circuit are performed by a software program. The advantages of the interface circuit is greatly increased operating speed.

The method and apparatus of the invention greatly reduce the amount of waiting time for each local processor in high traffic, file intensive local computer networks at a very low cost.

BRIEF DESCRIPTION OF THE DRAWINGS

FIG. 3A is a signal diagram useful in explaining the operation of the invention.

FIG. 3B is a diagram illustrating the configuration of the transmission header packet output onto the data bus by each contending local processor in the computer network of FIG. 2.

FIGS. 4A-4D are program flow charts of subroutines executed by each of the local processors in the network shown in FIG. 2.

FIGS. 5A-5C etc. constitute a detailed block diagram of the circuit shown in FIG. 1.

DESCRIPTION OF THE INVENTION

Figure 2:
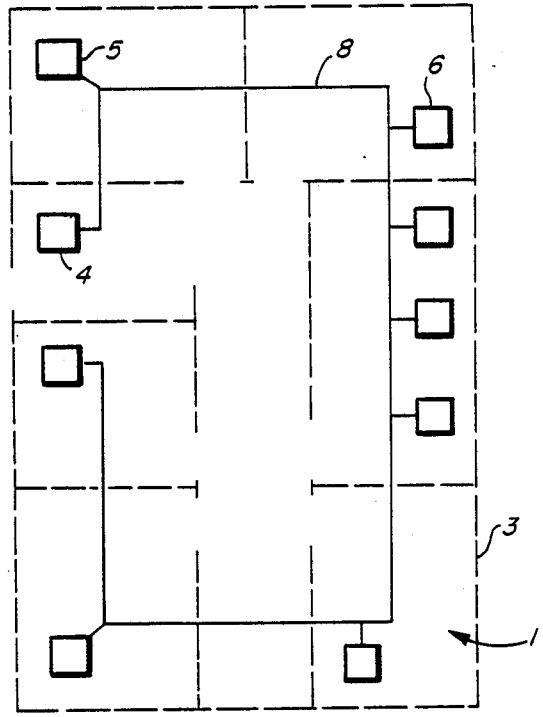
FIG. 2 is a schematic diagram illustrating a typical layout in a building of a local computer network.

Referring now to FIG. 2, reference numeral 1 generally designates a local computer network, i.e., a plurality of separate but interconnected computers. Hereinafter, local computer network 1 will be referred to as a "local network". Local network 1 is located within a building 3 having a number of different rooms as indicated by dotted lines. A plurality of local processors 4, 5 and 6 etc. are all connected to a common bus 8.

Figure 1:
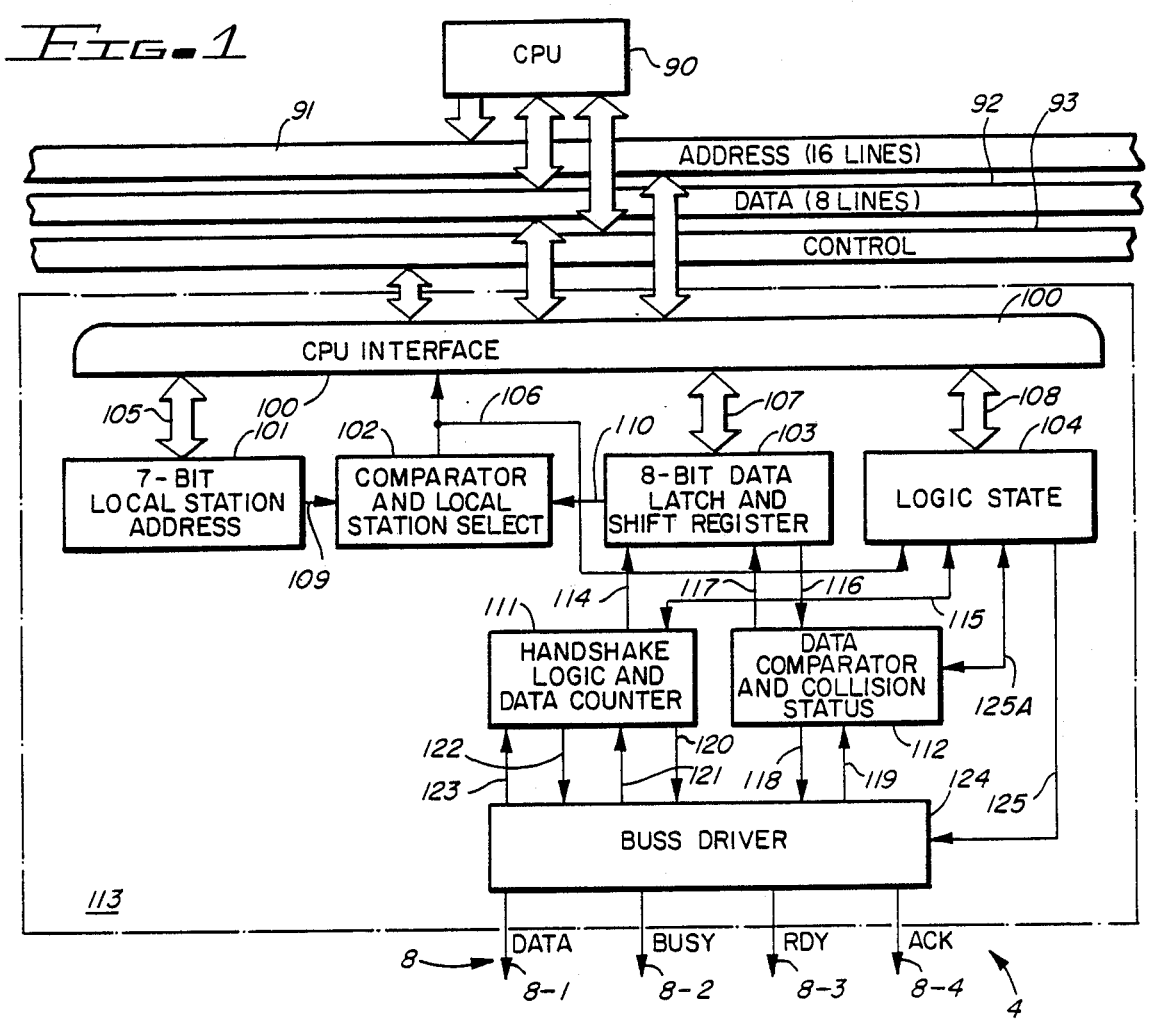
FIG. 1 is a block diagram of circuitry that can be used in conjunction with each processor connected to a local computer network of the present invention.

In the presently described embodiments of the invention, bus 8 includes four conductors indicated by reference numeral 8 in FIG. 1. More specifically, bus 8 includes a single bidirectional serial data bus conductor 8-1, a Busy signal conductor 8-2, a Ready (RDY) signal conductor 8-3, and an Acknowledge (ACK) signal conductor 8-4.

Perhaps understanding of the present invention can be best facilitated by first describing the signals that appear on the four conductors of bus 8. A timing diagram that explains the basic operation of the local network 1 is shown in FIG. 3A. Referring now to FIG. 3A, the data signals appearing on serial data bus 8-1 are designated by reference numeral 10 to indicate when data states change on the data lines 10 and when they are held steady. (The logic level definitions of "1" and "0" are arbitrary at this point in the description.) Busy signal conductor 8.2 is designated by reference numeral 11 in FIG. 3A. A high voltage signal as indicated by level 11-1 represents the condition that the data bus 8-1 is not busy, i.e., is available for access by any waiting local processor, such as 4, 5 or 6, etc. that needs access to the data bus. A low level, such as 11-2 on Busy conductor 8-2 indicates that the Busy conductor 8-2 is not available, and is being used in a "data transfer mode" by one of the local processors. Usually, busy signal 11 (FIG. 3A) will be at a high level during the bus arbitration or bus contention process subsequently described herein, and will go to a low level after the one of the local processors having the highest priority has gained control of the bus and is beginning to effectuate a transfer of data.

Signal 13 in FIG. 3A designates the Ready signal RDY. When the Ready (RDY) signal voltage is high, it is a logical "1" and indicates that data presently on the data bus is now valid and can be read by the local processors. Level 13-1 represents a logical "1" and reference numeral 13-2 represents a logical "0" on the Ready conductor 13. Reference numeral 15 identifies the Acknowledge (ACK) signal, which is at a logical "1" when it is at the high voltage level indicated by reference numeral 15-1 and is a logical "0" when at the level indicated by reference numeral 15-2.

The data bus conductor 8 is connected in wire ORed fashion to each of the local processors 4, 5, 6 etc. so that if any of them outputs a logical "1" onto the data bus, that logical level appears on data bus 8-1. However, if all of the local processors output logical "0's" onto the data bus, then a logical "0" appears thereon. Similarly, the Busy conductor 11, Ready conductor 13 and Acknowledge signal conductor 15 each are similarly connected in a wire ORed fashion to the local processors.

More specifically, if any of the local processors is engaged in a data transfer via data bus 8-1, it can pull Busy conductor 8-2 to the low logical level indicated by 11-2 in FIG. 3A, but if all of the local processors are passive and not using the data bus at all, then the high voltage level designated by reference numeral 11-1 in FIG. 3A appears on Busy conductor 802. If any of the local processors tries to get access to the data bus 8-1, when it is not busy, that local processor will pull Ready conductor 8-3 to the level indicated by reference numeral 13-2 in FIG. 2A. However, if none of the local processors asserts a low level on Ready conductor 8-3, then it will assume the high voltage level designated by reference numeral 13-1. Similarly, if any of the local processors tries to assert the low logic voltage level designated by 15-2 on Acknowledge conductor 8-4, that level will appear on Acknowledge conductor 8-4; but if all of the local processors release Acknowledge conductor 8-4, then it will have the high voltage level indicated by reference numeral 15-1.

The Ready signal 13 and the Acknowledge signal 15 of FIG. 3A illustrate how all of the local processors in local network 1 in effect operate in a synchronized or "handshaking" manner to output data onto data bus 8-1 or read data thereon.

More specifically, the handshaking operation is as follows. If the data bus becomes available, then all of the local processors wishing to gain access to the data bus to transmit a request try to pull the voltage on Ready conductor 8-3 to the low or logical "0" level 13-2 of FIG. 3A. The first one of the local processors to attempt this succeeds. As soon as one of the local processors detects that the Ready signal has gone to this low level, it pulls the Acknowledge conductor 8-4 to the low level indicated by 15-2 in FIG. 3A. Then any of the "contending" local processors wanting to get control of the data bus then asserts either a logical "1" or a logical "0" on data bus 8-1 in accordance with the data each processor is to transmit.

At this point, it should be understood that the first piece of information that any contending local processor tries to output onto the data bus is its most significant priority bit. In order to understand this better, it will be helpful to now refer to FIG. 3B, which illustrates a string of information that is output by each local processor that wishes to gain control of the data bus. This string of information is referred to as a "transmission header packet" and contains data necessary to resolve bus contention "disputes" and to define the request of the processor having highest priority on to the data bus. The transmission header packet includes three levels, identified as level I, level II and level III. Level I includes 8 bytes, the first two of which are reserved to perform a "priority override" function, so that under certain circumstances, a particular local processor can obtain higher priority than the normal "rotating priority" information contained in bytes 3 and 4. Bytes 3 and 4 represent a 16 bit "rotating" priority word which is incremented or otherwise modified each time a local processor fails to gain access to the data bus or fails to "merge" its request with that of the highest priority local processor, as subsequently explained. Byte 5 is a presently unused byte which may also be used at some future time for resolving bus priority disputes. Byte number 6 contains the address of the "source" or contending local processor attempting to gain control of the data bus. Byte number 7 is reserved for an "external" destination address, which is an address of a device, such as a remote processor coupled by a modem to the local network but is not considered to be part of the local network 1. Byte 8 contains the "object" address, which is the address of another local processor connected to the network to which the "source" local processor wishes to address a message.

Level I of the transmission header packet is referred to as the access level or access header portion thereof. Level II of the transmission header packet is referred to as the transaction validation header and includes byte 1, which defines the operating system under which the request being made by the subject contending local processor can operate. Byte 2 of level II defines the particular transaction that is requested under the operating system defined by byte 1 of level II. As an example, byte 1 of level II could define whether the CP/M operating system or the popular MS/DOS operating system is the one under which the transaction of byte 2 is defined. The transaction could be a request to "boot" the processor via the bus or to read (or write into) a particular sector on a particular mass storage device, such as a disc. Or, as another example, byte 2 of level II could define the transaction being requested as a data storage or retrieval operation, or it could be a request to access or to sign off a particular operation system. Or it could be a request for connection of the local network to another network specified by the object address of byte 8 of level I.

Level III in FIG. 3B contains a number of bytes that represent a "transaction control block". The information in the transaction control block actually defines the request being made and will contain such information as the name of the file that is to be accessed, whether or not the operation is to be a read operation or a write operation, what device will be accessed, etc.

Once the entire transmission header packet has been transmitted by a partiuclar local processor, then the actual transaction takes place; either commands from the local processor having control of the bus or data outputted by that local processor or data produced by some other device in response to the request then appear in serial fasion on data bus conductor 8-1 to effectuate the transaction. Each of the local processors in local network 1 (FIG. 2) attempts to output its entire transmission header packet (FIG. 3B) when the local processor attempts to gain control of the data bus. However, if a plurality of local processors are waiting for access to the data bus when Busy signal 11 (FIG. 3A) goes high, only the local processor having the highest priority (bytes 1-4 of level I) will succeed in getting control of the data bus; that processor is referred to as the "winning" processor. Ordinarily, unless there is a priority override situation, bytes 1 and 2 of level I of the transmission header packet are all "zeros". Usually, each of the contending local processors has a priority determined by bytes 3 and 4 of the access header. The longer a particular local processor has been waiting for access to the bus, the higher will be its rotating priority code.

Turning to FIG. 3A, each of the contending local processors which are trying to get control of the data bus then asserts a "0" or "1" onto the data bus. If any of them assert a "1", a "1" appears on data bus 8-1 (due to the wire ORed connection thereto). Or, if all of the contending local processors output logical "0's", then a logical "0" appears on the data bus. After enough time has been allowed for the output data 10 (FIG. 3A) to settle on the data bus, each of the local processors releases the ready signal 13 on ready conductor 8-3. The last one to release it causes the Ready signal to rise to the high level indicated by reference numeral 16 in FIG. 3A. At this point, the data on data bus is "valid", and can be read. Each of the contending local processors reads the value of data presently on data bus 8-1 and compares it to the logic level which that same local processor last asserted onto the data bus; if it matches, that local processor remains eligible to transmit further priority data onto data bus 8-1, but if there is mismatch, that local processor does not have the highest priority of the contending processors and becomes a "losing" processor that is now ineligible to assert further priority bits onto the data bus. When all of the contending local processors have read the data presently on the data bus, they "release" the Acknowledge conductor 8-4. When the last contending processor releases the Acknowledge conductor 8-4, it rises, as indicated by reference numeral 17, to the high or "1" level designated by 15-1 in FIG. 3A.

Thus, any time a particular local processor detects a mismatch between the data that it reads on the data bus and the data that same local processor last asserted on the data bus 8-1, a "data collision" is said to have occurred. Such a data collision automatically means that processor is a "losing" processor because it does not have the highest present priority for gaining access to the data bus.

In accordance with the present invention, each losing processor continues in a passive "monitor and compare" mode, to read all valid data bits appearing on the data bus 8-1 and compares them with the corresponding bits in its own transmission header packet. However, the losing processor does not assert any more bits of its own transmission header packet on the data bus.

It can be seen that by the time the least significant bit of byte 5 of level I of the transmission header packet has been transmitted onto the data bus during a particular bus contention dispute, the highest priority processor has emerged as the winning processor. All of the other contending processors have become "losing processors". By the time the winning processor has transmitted all of level I of the transmission header packet illustrated in FIG. 3B, sufficient information has been received by each contending processor to allow any one of them to adjust byte 1 or byte 2 or byte 4 or byte 5 of level I of its transmission header packet in accordance with any priority modification algorithm that might be used.

All losing processors continue to passively monitor the data bus and compare bytes 1 and 2 of level II of the transmission header packet that is then transmitted by the winning processors. Data collisions, if any, are detected in the same manner as indicated above. Any time one of the losing processors does detect a data collision, it "withdraws" from monitoring of the data bus, since it can gain nothing by continuing to monitor. If any losing processor has detected no data collision during transmission of bytes 1 and 2 of level II of the transmission header packet of the winning processor, that losing processor continues to read data appearing on data bus and continues to compare with its own transmission control block the corresponding bits of the transmission control block (shown in FIG. 3B) as they are transmitted onto the data bus by the winning processor.

In accordance with the present invention, the purpose of this continued monitoring of the data bus in comparing corresponding bits of the "monitoring" local processors with the transaction control block of the winning processor is to determine if the requests by the losing processors are "mergeable" with the request output on the data bus by the winning processor. If no data collisions are detected by a particular losing processor by the end of transmission of the transaction control block, the request of that losing processor is identical to the request of the winning processor, so the request of that losing processor is mergeable with that of the winning processor; both want the same data from the same source, so both may as well get it at the same time. Therefore, the losing processor continues to monitor the data bus during the actual transaction. Any local processor that determines (by evaluating differences between corresponding bits of its own transmission header packet and the transmission header packet of the winning processor) that its request is not mergeable with the request of the winning processor then withdraws from further monitoring of the data bus.

In some instances, if comparison of the transaction control block of the winning processor by a losing processor (that has survived the collision detection process up to level 3) shows that a portion of the data requested by that losing processor falls within the range of (i.e., is a subset of) data requested by the winning processor, that losing processor may determine that its request is indeed mergeable with the request of the winning processor, even though the requests are not identical. In this case, that losing processor continues to passively monitor the data bus, reads the data appearing on the data bus as a result of the request by the winning processor, reads that data, and rejects the portion of it that falls outside of the range of the mergeable request.

Before describing the programs executed by each of the local processors, perhaps it will be helpful to first explain the basic details of an interface circuit that is added to each local processor that is included in the local network in the present invention. In the presently preferred embodiment of the invention, each of the local processors includes an APPLE II Personal Computer. An interface circuit 113 of FIG. 1 is implemented on a printed circuit card which is plugged into each respective APPLE II Computer 90 and is connected to bus 8 of local network 1. In the preferred embodiment of the invention, these printed circuit interface cards reduce complexity of the programs that are executed by the various APPLE II Personal Computers in order to implement the networking concept of the present invention with simpler software requirements, and greatly increase the data throughput rate.

Referring now to FIG. 1, reference numeral 113 designates one of the above-mentioned interface circuits, one of which is included in each of the respective local processors, such as local processor 4. Each local processor such as 4 also includes a computer 90. Note that the implementation of interface circuit 113 is shown in great detail in FIGS. 5A–5C. However, the exact operation of the circuit of FIGS. 5A–5C is not given because it is not necessary to a thorough understanding of the invention. The CPU interface circuitry in block 100 includes bus driver circuitry and address decoder circuitry (as subsequently explained with reference to FIGS. 5A–5C). Computer 90 has a 16 bit address line designated by reference numeral 91 and an 8 bit data bus designated by reference numeral 92. Computer 90 also includes a control bus 93 which includes several control lines, including several interrupt lines.

Interface circuit 113 includes seven normal local address switches, designated by reference numeral 104, which are preset by a technician at the time of installation of local network 1 to establish the address of local processor 4. After the local address switches 104 have been set, the "source" address or local station address can be read by computer 90 by means of conductors 105, which are coupled by means of CPU interface circuitry 100 to address bus 91, and data bus 92, and control bus 93.

Interface circuit 113 includes an 8 bit data latch and shift register circuitry in block 103, into which data from computer 90 is loaded, one byte at a time, before it is serially shifted out and asserted on data bus 8-1. Serial data on the data bus 8-1 being read by local processor 4 is also loaded into the 8 bit data latch and shift register circuitry in block 103.

Interface circuit 113 also includes comparator circuitry in block 102 which makes a direct, immediate comparison of a destination address (which has been loaded from data bus 8-1 into the 8-bit data latch and shift register circuit in block 103) with the permanent setting of the seven local station address switches 101. The outputs of the 8-bit data latch in block 103 are connected by conductors 116 to the comparator circuitry in block 102, as are the states of the local station address switches 101 by means of seven conductors 109. If they match, the comparator circuitry in block 102 sends a signal on conductor 106 via CPU interface circuitry in block 100 to the interrupt line of control bus 93, interrupting computer 90 to notify it that it is the destination of the request identified in levels 2 and 3 of the transmission header packet being output by the winning processor onto the network data bus 8-1. (Note that operation of the circuit is not dependent on interrupt capability, since the comparator state is also transmitted to block 104 wherefrom it may be read by the CPU).

The handshake and data counter circuitry in block 111 controls the sequence of the above-mentioned handshake operations (involving the Data Ready, and Acknowledge conductors) to accomplish "synchronization" of asserting and reading of each bit of data appearing on the data bus 8-1. The Data counter circuitry in block 111 controls the number of times a handshake sequence is carried out, i.e., eight times for each byte transmitted from personal computer 90 to network data bus 8-1 or received from data bus 8-1 before interrupting computer 90 to cause it to either load a new byte into the 8-bit data latch and shift register circuitry in block 108 for serial outputting onto data bus 8-1), or read the contents of the 8-bit data latch which has been serially loaded from data bus 8-1.

In the former operation, computer 90 writes 8 bits into the 8-bit data latch and shift register circuit in block 103, and at the same time resets the data counter in block 111. The handshake logic in block 111 effectuates eight sequential handshake operations shifting the data out of the shift register in block 103 into data comparator and collision status circuitry in block 112. From there, the data is moved via conductor 118 to bus driver circuitry in block 124 and from there to data bus 8-1. After the entire 8-bit byte has been transmitted to network data bus 8-1, the data counter circuitry in block 111 signals the computer 90 that all 8-bits have been output onto the network data bus 8-1. For reading operation, the above sequence is essentially reversed.

The logic state circuitry in block 104 includes a plurality of addressable latch circuits which either function as flags that can be read by computer 90 or as status bits that control the internal working of interface circuit 113. One of the logic states that is set by conductor 106 indicates whether or not local processor 4 is the destination of the request or message being output by the winning local processor. Another logic state of circuitry in block 104 indicates whether the present operation being carried out by local processor 4 is a reading operation or a writing operation. Another flag in block 104 indicates whether local processor 4 is operating in a data bus monitoring and comparison mode, i.e., whether local processor 4 is a "winner" or a "loser" in the bus contention dispute. Reference numeral 125A designates conductors by means of which block 104 responds to detection of a collision by block 112 to set the collision status flags in block 104 and by means of which a set collision status flag in block 104 communicates this status to block 112 to prevent outputting of further data by interface circuit 113 onto data bus 8-1, to allow continued monitoring of data bus 8-1, if the collision status flag has been set. Another flag indicates whether there was a collision detected during the last byte. One of the bits in logic state circuitry 104 is triggered at the same time that data is input to the 8-bit data latch and shift register circuit in block 103 in order to reset the data counter in block 111. Every time a new byte is loaded into the 8-bit data latch and shift register circuit, the collision state flag also has to be reset.

The data comparator and collision status circuitry in block 112 rapidly performs the comparisons between the data being transmitted by the winning processor and the request that local processor 4 would have made if it had been the winning processor. In other words, the transmission header packet of the winning processor actually appearing on network data bus 8-1 is compared, one bit at a time, against the corresponding bits of the transmission header packet of each respective losing processor that is still in the monitor and compare mode.

For the bus monitoring portion of the operation, the incoming data is input to data comparator circuitry in block 112, which is compared with the last bit that was output on data bus 8-1 and is still present in the 8 bit data latch. A comparison is automatically made by the data comparator in block 112, and if a data mismatch or collision is detected, the collision flag in block 104 is set by means of bus 127.

The detailed implementations of the various blocks shown in FIG. 1 are shown in detail in the block diagram of FIGS. 1 and 5A–5C. Referring now to these drawings, the logic state circuitry 104 is essentially that circuitry included within the dotted lines designated by reference numeral 104 in FIGS. 5A and 5B. This includes an integrated circuit LS 259 addressable latch (available from various manufacturers), two LS123 integrated circuit one-shot timers, and two LS74 integrated circuit flip flops, as shown. CPU interface circuitry 100 includes the circuitry within the dotted line block designated by 100 in FIGS. 5A and 5C, including an LS138 addressable decoder integrated circuit, an LS245 integrated circuitry bidirectional bus driver, and two LS367 integrated circuit three-state buffer circuits. The circuitry in block 103 of FIG. 1 is implemented by means of an LS299 integrated circuit 8 bit parallel access shift register.

The 7 bit local station address switches are implemented by means of any suitable commercially available eight position DIP switch, as indicated in the dotted line block 101 in FIG. 5C. The comparator function of block 102 in FIG. 1 is performed by seven exclusive OR circuits within dotted line block 102 in FIG. 5C. The remaining circuitry shown in FIGS. 5A and FIG. 5B is included in handshake logic data counter logic circuitry in block 111 of FIG. 1 and includes an LS93 integrated circuit 4-bit binary counter, two LS123 integrated circuit one-shot timers, and several LS74 integrated circuit flip-flops.

Now that the structure and basic operation of the interface circuit have been explained, it should be understood that there are two embodiments of the invention, one being a preferred "hardware version" which does include interface circuitry 113, and the other being a "software version" which does not use the interface circuit 113 and instead uses a much simpler interface circuit (not shown). In the "software version" the interface circuit consists of a set of addressable latches which directly control the state of the bus lines. These latches are driven by a computer program according to which the CPU examines the state of each incoming line and modifies the state of the latches so as to place a data signal on the bus and effectuate the handshaking process. Incoming signals are ORed with the latch states and retransmitted to the next card which performs the same function in concert with its CPU. No function is performed by the card alone other than ORing and retransmitting the signal; however, the sequence of events under software control performs essentially the same functions as the "hardware version".

Figure 4C:
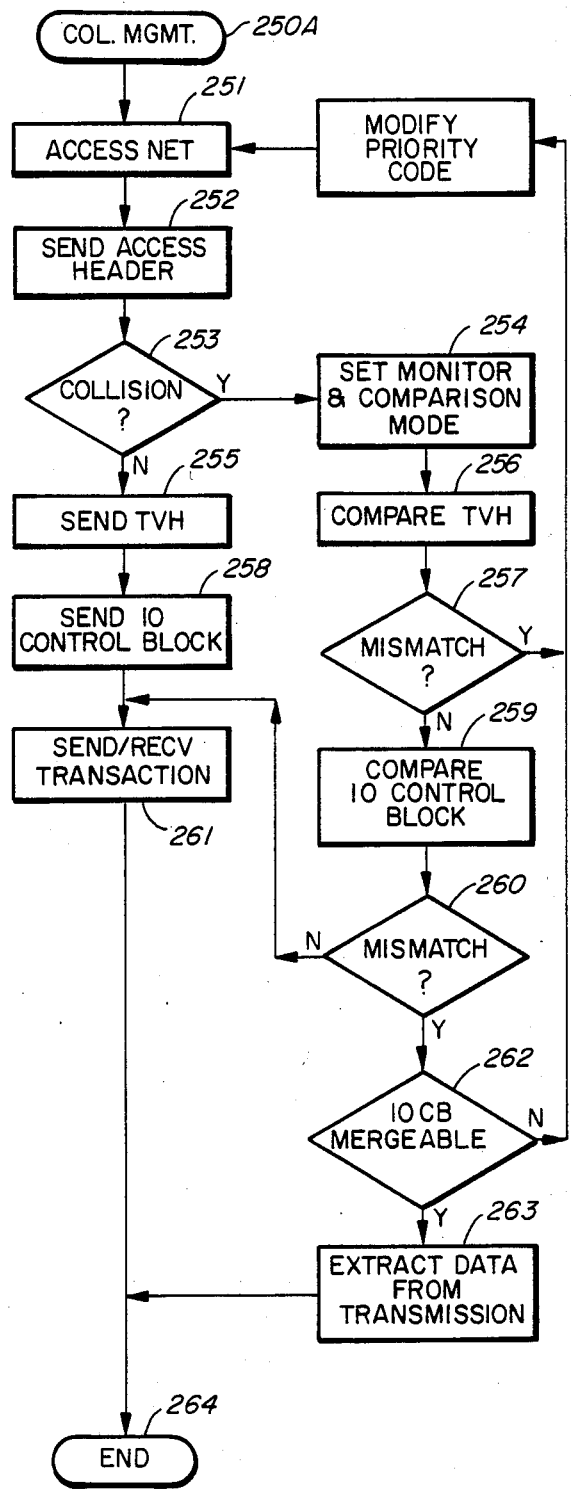

The flow charts of FIGS. 4A–4D are helpful in understanding both the hardware version and the software version. Therefore, in the following explanation of the flow charts, the relevance of the operations of the flow charts to both the "software version" and "hardware version" of the invention will be set forth. FIG. 4A is a flow chart of a subroutine called SIMLWRITE, which is executed in the software version of the invention. Each time the computer outputs a byte of data for serial assertion on data bus 8-1, but it is also useful in understanding part of the operation of interface circuitry 113, and is therefore useful in understanding the basic method of the present invention. The method of the flow chart of FIG. 4A is repeated eight times for each byte of information that a particular local processor wishes to output on the network data bus 8-1.

In the hardware version, interface circuit 113 simply receives one byte of data that computer 90 wishes to output onto data bus 8-1. That byte is loaded into the 8-bit data latch circuit in block 103; computer 90 has no further involvement with the transmission until the data counter circuit in block 111 of FIG. 1 indicates to computer 90 that all 8 bits have been shifted out of the data latch and shift register circuit in block 103, through the data comparator and collision status circuitry in block 112, through bus driver circuit 124, and serially onto data bus 8-1.

In FIG. 4A, before entering the label 210, computer 90 prepares a byte of data to transmit. This consists of computer 90 loading the next byte to be transmitted into one of the CPU registers. Another thing that is done by the processor before entering the routine of FIG. 4A is to establish that a transmit operation is what is desired. This corresponds to computer 90 setting a flip-flop in block 104 indicating that the interface circuit 113 is to operate in a WRITE (or transmit) mode. In block 211, one of the "initializing" operations referred to is to initialize a software bit counter. In interface circuit 113, this corresponds to setting the data counter in block 111, and occurs when the 8 bit data is placed in the 8 bit data latch and shift register circuit in block 103.

In interface circuit 113, when computer 90 writes the next byte to be transmitted into 8 bit data latch and shift register circuit 103, the data collision flag in block 104 is reset by means of the data counter in block 111 and is automatically reset by means of conductor 115. Computer operations involving setting or reading states in block 104 occur by means of bus 108 in FIG. 1.

In the software version of the invention, after initialization and resetting of the collision flag, the program of FIG. 4A then goes to decision block 212 and tests the collision flag to determine if it is set. In the hardware version of the invention, this function is automatically carried out by the data comparator and collision status circuitry in block 112. If the determination of decision block 212 is affirmative, and there has been a data collision, the program goes to block 214 and outputs a logical "0" on the data bus 8-1. (It should be appreciated that on entering the program of FIG. 4A, the computer would set the Ready signal conductor 8-3 and would already be a logical "0"). In block 214, in addition to outputting a logical "0" on the data bus 8-1, the computer sets the Ready signal to the logical "0" level indicated by 13-3 in FIG. 3A. The program then goes to block 215.

If the decision of block 212 is affirmative, the program goes to block 213 and causes the most significant bit of the present byte to be asserted on the network data bus 8-1. In the hardware version of the invention, this function is controlled by the state of the collision flag (which is a flip-flop in block 104 of FIG. 1) and a circuit in block 112 that allows only "0's" to be outputted to data bus 8-1 if the collision flag is set.

As soon as this is done, the program causes the Ready signal to be set to a logical "1".

In the software version of the invention, the program of FIG. 4A then goes to block 215, samples the state of the Acknowledge conductor 804, determines in decision block 216 whether the Acknowledge signal is set to a logical "1", and if it is not, the program continues looping back through block 215 until the last receiving local processor finally releases the Acknowledge conductor 8-4, at a point indicated by reference numeral 17 on the timing diagram of FIG. 3A. In the hardware version of the invention, the handshake logic and data counter circuitry of block 111 automatically performs this function.

In the software version of the invention, the program of FIG. 4A then goes to block 217. In block 217, once the Acknowledge signal 15 is set to a "1" level 15-3 in FIG. 3A, this means that the data on data bus 8-1 has been received. In the software version of the invention, the program, in block 217, reads the data that is presently on data bus 8-1, and then resets the Ready signal to the level indicated by reference numeral 13-4 in FIG. 3A concluding the tramission of that bit. In the hardware version of the invention this is automatically done by circuitry in block 112 that monitors the status of data bus 8-1. The program then goes to decision block 218 and compares the data previously read in block 217 to the last bit asserted onto data bus 8-1 by the subject local processor. In the hardware version of the invention, the data comparator circuitry in block 112 automatically performs the comparison corresponding to decision block 218. If there is a mismatch, a collision flag is set, in block 104 of interface circuit 113 (for the hardware version of the invention) or in a software register in a computer program represented by the flow chart of FIG. 3A (for the software version). In the software version of this invention, the program goes to block 220 and reads the state of the Acknowledge conductor 804, and in decision block 221 tests to see if the Acknowledge signal 15 has been reset. When the Acknowledge signal has been reset to the level indicated by reference 15-4 in FIG. 3A, the program goes to block 222 and shifts to the left (in a software register) the next bit to be serially asserted onto data bus 8-1. In the hardware version of the invention, these functions are automatically performed by the handshake logic in block 111 and the shift register in block 103 of FIG. 1. In the software version, a software bit counter keeps track of which bit in the present byte is to be shifted out next onto data bus 8-1 is incremented in block 222. Correspondingly, the data counter in block 111 in interface circuit 113 is automatically incremented each time data is shifted in the shift register in block 103.

Then, as indicated in decision block 223, the state of the software bit counter of the software program, or the hardware data counter in interface circuit 113, is tested to see if the entire present byte has yet been asserted onto data bus 8-1. If this has not yet been accomplished, the program of FIG. 4A returns to decision block 212 and continues repeating the process until the bit count does expire. When this finally happens, the subroutine of FIG. 4A exits to the calling program (which is shown by the flow chart of FIG. 4D) at label 224. In the hardware version of the invention, the handshake logic and data counter circuitry in block 111 send an interrupt signal to computer 90 informing it to output the next byte into the 8-bit data latch and shift register circuitry in block 103.

The next flow chart, shown in FIG. 4B, is a flow chart of a software program that can cause a computer such as the above-mentioned APPLE personal computer to perform essentially the same functions as interface circuit 113 when the local processor is functioning as a receiver, rather than as a transmitter of information. As previously mentioned, the program shown in FIG. 4B can be executed by a computer having a much simpler interface card than 113, i.e., which merely functions in response to the program instructions, as previously explained.

In the hardware version of the invention, computer 90 (in FIG. 1) is required to perform essentially no other function when local processor is in its receive mode than to check to determine when the 8-bit data latch and shift register circuit 103 has been filled up with the serially incoming data on data bus 8-1. Every time this happens, the data counter in block 111 so indicates (via a flag in block 104) to computer 90, alerting it to read that byte out of the 8-bit data latch in block 103.

In the software version of the invention, the program of FIG. 4B is entered when the local processor is set to its receive mode. In block 202, the program initializes its software bit counter. In the hardware version of the invention, circuitry in block 111 automatically initializes the data counter in block 111 every time the 8-bit data latch and shift register circuitry of block 103 has been read, removing the last complete byte of incoming data.

The program of FIG. 4B goes from block 202 to block 203 and senses the state of the Ready signal 13 on conductor 8-3, and if it is set to a logical "1", as determined by decision block 204, the program moves onto block 205. If the Ready signal is not a "1", the program loops back through block 203 until the Ready signal goes to a "1". This is how the program determines when the data is "valid". The Ready signal is set to the desired "1" state when it is at the level indicated by 13-3 in FIG. 3A.

In block 205, the program reads the least significant bit of the present byte which has been received from data bus 8-1, and then sets the Acknowledge signal 15 on conductor 8-3 to level 15-3 in FIG. 3A. In the hardware version of this invention, serially incoming data on data bus 8-1 is fed via conductor 119 through block 112 and into the least significant bit input of the data latch and shift register circuitry in block 103.

Next, the program of FIG. 4B goes to blocks 206 and 207 and keeps testing the state of the Ready conductor 8-3 until it is a logical "zero", at the level indicated by reference numeral 13-4 in FIG. 3A, concluding transmission of that bit.

Next, the program of FIG. 4B goes to block 208 and applies a logical "0" to the Acknowledge signal, bringing it to the level indicated by reference numeral 15-4 in FIG. 3A. In the hardware embodiment of the invention, the handshake logic in block 111 of interface circuit 113 in essence performs the foregoing function automatically. The interface circuit 113 automatically releases the Acknowledge line as the data is shifted into the shift register, and automatically resets the Acknowledge line to a "0" in response to data transmission by the Ready conductor.

The program of FIG. 4B then goes to block 209, shifts data left in a software register and increments a software bit counter that keeps track of which bit of the present byte was just received. In the hardware version of the invention, this is done automatically by the circuitry in block 111 and block 103 of FIG. 1.

The program then goes to decision block 209A and determines if the bit count has expired, that is, if the last bit of the present byte has been received. If this is true, the subroutine is exited but if it is false, the program returns to block 203 and repeats the sequence for the next incoming bit of the present byte. As previously explained, this function is automatically performed in the hardware version of the invention by the data counter circuitry in block 111 of interface circuit 112. In the "hardware" system of FIG. 1, all that computer 90 does while the present byte is incoming on data bus 8-1, is continually test a flag to see if the data counter has counted from 0 to 7, and when it has, computer 90 knows to read the contents of 8-bit data latch and shift register circuitry in block 103.

The "collision management" subroutine of FIG. 4C is entered at label 250A as a result of a decision by computer 90 that local processor 4 needs to gain access to the network. In block 251, the program waits until the Busy signal on conductor 8-2 goes high, as shown in FIG. 2A. At this point, all contending processors wanting access to the network bus 8-1 begin to send their access headers to the data bus 8-1, as indicated in block 252, by calling the SEND subroutine shown in FIG. 4D utilized to effectuate block 252 of FIG. 4C. Therefore, at this point it will be helpful to explain FIG. 4D.

Figure 4D:
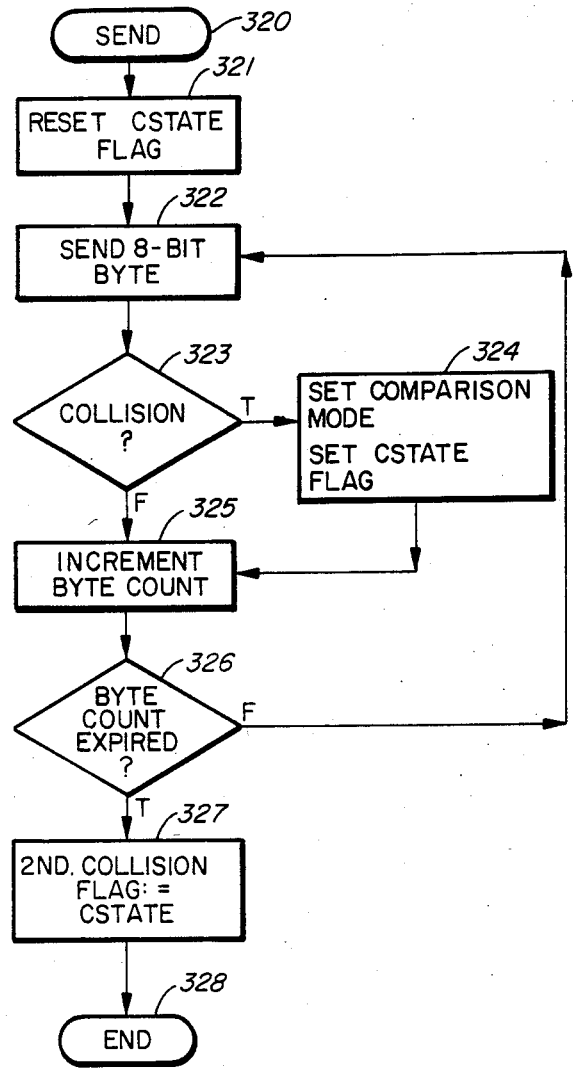

Referring now to FIG. 4D, the SEND subroutine is entered at block 320 whenever it is called from block 252, 255, 256, 258, 259 or 261 of the collision management program of FIG. 4C. In block 321, the SEND subroutine resets a collision state flat called CSTATE to a "zero". The subroutine then goes to block 322 and causes the processor to output the next 8-bit byte of data to be transmitted.

This function is performed with interface circuit 113 interfacing between computer 90 and network bus 8. However, if less sophisticated interface circuitry (not shown) than that in interface circuit 113 is used, the subroutines of FIGS. 4A and 4B can instead be utilized to provide the send and receive "interface" functions. For example, in FIG. 4D, in the hardware embodiment of the invention, the function of block 324 is performed by means of interface circuit 113, whereas those functions are performed by calling the SIMLWRITE subroutine of FIG. 4A in the software embodiment of the invention.

Next, the SEND subroutine of FIG. 4D goes to decision block 323 and tests the first collision flag set in block 219 resulting from the SIMLWRITE routine of FIG. 4A. In the hardware version of the invention, CPU 90 simply tests a corresponding flag in block 104. If this flag has been set, the subroutine of FIG. 4D goes to block 324 and sets the first comparison state flag and the CSTATE flag to a logical "1" and then goes to block 325. If the determination of decision block 323 is negative, then the program goes to block 325. In block 325 the program increments the byte count. In decision block 326, the subroutine determines if all bytes that are to be output by the processor have been output, and if not, returns to block 322. If all bytes of the access header have been transmitted, the program goes to block 327 and sets a second collision flag to the same state as the CSTATE flag set in block 324. The SEND subroutine of FIG. 4D then returns to the program of FIG. 4C.

Returning now to the description of FIG. 4C, after the access header has been sent, the program goes to decision block 253 and tests the second collision flag (of block 327 has been set, this means that the local of FIG. 4D). If it processor executing the program of FIG. 4C is a "losing" processor, i.e., that local processor is not the highest priority contending processor. As a result, the program goes to block 254 and sets a flag that puts that contending processor in a "monitor and compare" mode. In the hardware version of the invention, the flag is in block 104. In the software version, the "monitor and compare" mode state would be stored in an appropriate software register. However, if the decision of block 253 is negative, there has been no data collision during transmission of the priority access header, so the subject contending processor is the highest priority or "winning" processor.

In this event, the winning processor simply goes to block 255, calls the SEND subroutine of FIG. 4D, and transmits the "transaction validation header" information, i.e., the level 2 portion of the transmission header packet shown in FIG. 3B. Then the program moves to block 258 and sends the input/output control block portion of the transmission header packet indicated by level 3 in FIG. 3B, again calling the SEND subroutine to effectuate transmission thereof. Next, the program goes to block 261 and performs whatever transmission and/or reading operations are necessary to carry out the transactions specified by the I/O control block portion of its transmission header packet. "Sending" portions of the transaction will be effectuated by calling the SEND subroutine of FIG. 4D and "RECEIVE" portions will be effectuated by calling the SIMLREAD subroutine of FIG. 4B. When the transaction is complete, the program of FIG. 4C is exited via block 264 and returns to the main control program of the winning processor.

If the particular processor executing the program of FIG. 4C is a losing processor, the program then is set to the "monitor and compare mode" as previously indicated with reference to block 254. The program then goes to block 256, but does not actually transmit its transaction validation header. Instead, it continues to read the data appearing on the data bus 8-1, which data will be the transaction validation header being transmitted in accordance with block 255 of the identical program being executed by the winning processor. (It should be noted that in blocks 252, 255, 256, 257, 258 and 261, the SEND and/or SIMLREAD subroutines are called only for the "software version" of the invention. If the interface circuit 113 of FIG. 1 is used, then the functions of the SEND and SIMLREAD subroutines are automatically carried out at very high speed by the circuitry contained in iterface circuit 113.)

The send block program of FIG. 4D will set the comparison mode flag in block 321 thereof, and then, when it calls SIMLWRITE in block 322, it will recognize in block 212 that a collision flag has been set and will only output logical "zeros" and will never output a logical "1", thereby effectively placing that local processor in a read or monitor mode.

If a collision or mismatch is detected in decision block 257 of FIG. 4C, this means that the subject local processor cannot merge its transaction with that of the winning processor, and therefore modifies its priority according to a suitable priority subroutine to improve its likelihood of success on the next try. It then goes back to block 251 and waits for the bus to become available again.

Next, the program moves to block 259, and calls the SEND routine of FIG. 4D which, in turn, calls SIML-WRITE, and compares its own I/O control block with the I/O control block being transmitted by the winning processor (which is executing block 258 of the program of FIG. 4C of its own collision management program). If no mismatch is detected, as indicated in decision block 260, then the losing local processor has determined that its entire transaction header is identical to that of the winning processor, and therefore its transaction can be merged with that of the winning processor. The losing processor then goes to block 261 and performs, in parallel with the winning processor, whatever send and receive operations are necessary to carry out the merge transactions and then exits its collision management program via block 264.

If the determination of decision block 260 is affirmative and there has been a mismatch, this does not necessarily means that the transaction desired by the losing processor is not mergeable with the transaction to be carried out by the winning processor. If the data which is to be conducted on the data bus when the transaction desired by the losing processor is actually carried out is contained as a subset of the transaction data for the winning processor, then the transaction of the losing processor is nevertheless mergeable with the transaction of the winning processor. This determination is made in decision block 262, and if the determination is negative, then the losing processor returns to block 251 and waits in line for its turn to gain access to the data bus when its priority byte finally has the highest value of any contending processor. If the determination of block 262 is affirmative, the program goes to block 262 and executes a very simple subroutine for extracting its subset of data from the transmissions that constitute the transaction carried out by the winning processor.

This consists of reading all of the transaction data while discarding all data (if any) preceding the desired block of data; reading the desired block of data; and finally, ignoring any additional data following the desired block of data.

Appendix A is a print-out of a computer program executed by an APPLE II personal computer corresponding to the flow charts of FIGS. 4A and 4B. Similarly, Appendix B is a print-out of the program subroutine of FIG. 4C, and Appendix C is a print-out corresponding to FIG. 4D.

While the invention has been described with reference to several particular embodiments thereof, those skilled in the art will be able to make various equivalent modifications thereto without departing from the true spirit and scope of the invention. For example, the definition of the various CPU buses may differ from that indicated above, since the signals present on the buses to control the function of the circuitry may be adopted in different ways to control the interface circuit 113.

APPENDIX A

```
!L  1  ;FILE: RDWRXC9/11.
    2  ;DATE: 9/11/82
    3  ;PROG: D NERING
    4  ;      J BUCANEK
    5  ;##
    6  ;#
    7  ;# ACCESS, CLEAR LINES,
    8  ;# READ & WRITE CALLS
    9  ;#
   10  ;##
   11  ;
   12  ; ZERO PAGE
   13  ;
   14  DATA      EPZ $ED
   15  BITCNT    EPZ $EE
   16  COLLSN    EPZ $EF
   17  ;
   18  ; TWO BYTE
   19  ;
   20  LNKFLG    EQU $AAC4              ;SYSTEM LINK FLAG
   21  ;
   22  ; ROS HARDWARE
   23  ; FOR ANY SLOT
   24  ;
   25  BITCLR    EQU $CF80
   26  BITSET    EQU $CF81
   27  RDYCLR    EQU $CF82
   28  ACKCLR    EQU $CF82
   29  RDYSET    EQU $CF83
   30  ACKSET    EQU $CF83
   31  REQCLR    EQU $CF84
   32  REQSET    EQU $CF85
   33  BITLIN    EQU $CF86
   34  SUSPND    EQU $CF86
   35  RDYACK    EQU $CF87
   36  BSYREQ    EQU $CF88
   37  ;
   38  ;
   39            ORG $BC00
   40  ;
   41  ;*****************************
   42  ;
   43  ; ACCESS SUBRTN              -   ACCESS NETWORK BUSS
   44  ;                            -   WHEN NOT BUSY
   45  ;
   46  ACCESS    LDX #$00
   47  TRYAGN    ASL BSYREQ             ;STATUS BUSY?
   48            BCS CHKAGN             ;(Y)LOOP WAIT
   49            ASL BSYREQ             ;(N)VERIFY?
   50            BCC GOTACC             ;(Y)GOT ACCESS
   51  CHKAGN    DEX
   52            BNE TRYAGN             ;LOOP AGAIN
   53  CLROFF    PHP                    ;(Y)KEEP C SET
   54            STA BITCLR             ;(Y)CLR DATA
   55            STA RDYCLR             ;CLR RDY/ACK
   56            STA REQCLR             ;CLR BSY/REQ
   57            LSR LNKFLG             ;SYSTEM FLAG
   58            PLP
   59            RTS                    ;C=1=ERR
   60            NOP
   61  ;
```

```
 62 GOTACC    STA REQSET        ;SET REQ LINE
 63          RTS                ;C=0=NO ERRY
 64 ;------------------------------------
 65 ;
 66 ; READ & WRITE SUBRTNS
 67 ; W/ COLLISION DETECT
 68 ;
 69 ;
 70 ; READ W/ ECHO FOR COLLISION CHK       -   FLOWCHART SIMLREAD
 71 ;
 72 SIMLRD    LDX #$08          ;FOR 8 BITS       -202 INITIALIZE
 73          LDA #$00           ;ZIP ACC
 74 NXTRCV    LDY #$00          ;ZIP ERR CNT
 75 CHKRDY    BIT RDYACK        ;GET RDY?         -203 GET READY
 76          BMI GETBIT         ;(Y)READ BIT      -204 READY TRUE
 77          INY                ;ERR OUT?
 78          BNE CHKRDY         ;(N)CHK AGAIN     -204 READY FALSE
 79          SEC                ;(Y)C=1=ERR       -    EXIT ON ERROR
 80          RTS                ;ERR EXIT
 81 GETBIT    ASL BITLIN        ;BIT > C          -205 GET DATA BIT
 82          STA BITCLR         ;CLR LINE
 83          BCC ECHOZR         ;BIT=1?
 84          STA BITSET         ;(Y)SET LINE      -    ECHO DATA
 85 ;SHIFT DATA IN LSB TO MSB
 86 ECHOZR    ROR               ;BIT > ACC        -205 SHIFT BIT IN
 87          STA ACKSET         ;SET ACK          -205 SET ACKNOWLEDGE
 88          LDY #$00
 89 CHKRLS    BIT RDYACK        ;RELEASE?         -206 GET READY
 90          BPL SHKRLS         ;(Y)GO ON         -206 READY FALSE
 91          INY                ;ERR OUT?
 92          BNE CHKRLS         ;(N)CHK AGAIN     -206 READY TRUE
 93          SEC                ;(Y)C=1=ERR       -    EXIT ON ERROR
 94          RTS
 95 SHKRLS    STA ACKCLR        ;CLR ACK          -208 RESET ACKNOWLEDGE
 96          DEX                ;DONE?            -209 DECREMENT COUNT
 97          BNE NXTRCV         ;(N)NEXT BIT      -209 NEXT DATA BIT
 98          RTS                ;(Y)C=0=NO ERR    -    END OF BYTE
 99 ;
100 ; BYTE WRITE W/ COLLISION CHK          -   FLOWCHART SIMLWRITE
101 ;
102 SIMLWR    PHA               ;PUT ACC
103          STA DATA           ;DATA REG
104          LDA #$08           ;FOR 8 BITS       -211 INITIALIZE
105          STA BITCNT         ;COUNT REG
106          LDA #$00           ;CLEAR            -211 RESET COLLISION
107          STA COLLSN         ;COLLSN BYTE
108 NXTSND    LDA COLLSN        ;CHK COLLSN       -212 GET COLLISION
109          PHP                ;SAVE Z FLG
110          LDA #$00           ;ZIP ACC
111          TAY                ;ZIP ERR CNT
112 ;SHIFT DATA OUT MSB TO LSB
113          ASL DATA           ;BIT > C          -    PREPARE DATA
114          ROL                ;BIT > LSB
115          TAX                ;0:1 > Y INDX
116          LSR                ;BIT > C
117          ROR COLLSN         ;BIT > MSB
118          PLP                ;COLLISION?       -212 CHECK COLLISION
119          BEQ SYNCYC         ;(N)SEND BIT      -212 COLLISION FALSE
120          TAX                ;(Y)SEND ZIP      -212 COLLISION TRUE
121          NOP                ;2CYC
122 SNDBIT    STA BITCLR,X      ;CLR:SET DATA     -213 (214) DATA OUT
123          STA RDYSET         ;SET RDY          -213 SET READY
124 CHKACK    BIT RDYACK        ;GET ACK?         -215 GET ACKNOWLEDGE
```

```
125            BMI RDECHO      ;(Y)READ ECHO    -216 ACKNOWLEDGE TRUE
126            INX             ;ERR OUT?
127            BNE CHKACK      ;(N)CHK AGAIN    -216 ACKNOWLEDGE FALSE
128            BEQ ERROUT      ;(ALWAYS)ERR     -    EXIT ON ERROR
129 SYNCYC    BEQ SNDBIT       ;(ALWAYS)3CYC
130 RDECHO    ASL BITLIN       ;RD EBIT > C     -217 GET DATA ECHO
131           STA RDYCLR       ;CLR RDY         -217 RESET READY
132           ROR              ;EBIT > MSB
133           EOR COLLSN       ;BIT=EBIT?       -218 COMPARE DATA/ECHO
134           STA COLLSN       ;SAVE RESULT     -219 NOT 0 IF COLLISION
135 CHKPAS   BIT RDYACK        ;PASS ACK?       -220 GET ACKNOWLEDGE
136          BPL PASACK        ;(Y)GO ON        -221 ACKNOWLEDGE FALSE
137          INY               ;ERR OUT?
138          BNE CHKPAS        ;CHK AGAIN       -221 ACKNOWLEDGE TRUE
139 ERROUT   PLA               ;GET ACC
140          LDX #$FF          ;Z=1=ERR
141          SEC               ;C=1=ERR         -    EXIT ON ERROR
142          RTS               ;ERR EXIT
143 PASACK   DEC BITCNT        ;DONE?           -222 DECREMENT COUNT
144          BNE NXTSND        ;(N)NEXT BIT     -223 NEXT DATA BIT
145          PLA               ;(Y)GET ACC      -223 END OF BYTE
146          LDX COLLSN        ;Z=COLLSN FLG    -224 RETURN COLLISION
147          CLC               ;C=0=NO ERR
148          RTS               ;NORM EXIT
149 ;
150 ;
151 ;COPYRIGHT 1982 BY SOFTWORKS, INC.
152 ;END OF FILE
153          END
```

APPENDIX B

```
!L 1  TTL "AROS 2.20/1 NETWORK CONTROL"
   2  ;FILE: AROS1.
   3  ;PROG: J BUCANEK
   4  ;      D NERING
   5  ;DATE: 83-AUG-11
   6  ;
   7  ;****
   8  ;***
   9  ;**
  10  ;*   NETWORK AQUISITION AND CONTROL
  11  ;**
  12  ;***
  13  ;****
  14  ;
  15  ; VOLUNTARY EXIT (UNCONDITIONAL)
  16  ;
  17 QUITX    LDA LITSAV     ;SCREEN CHAR
  18          STA LITLOC     ;RESTORE CHAR
  19          STA STROBE     ;CLR KEYBRD
  20          JSR DISCNCT    ;DISCONNECT
  21          LDA #$00       ;CLR FLGS
  22          STA $AAB3      ;CANCEL EXEC
  23          JMP QUEXIT     ;EXIT
  24  ;
  25  ; GAIN ACCESS BY ID CODE        - ACCESS NETWORK
  26  ;                               - SEND PRIORITY & TVH
  27  ;
  28  ; IF LNKFLG AND BSY THEN PSTAT:=NEG END
  29  ; ELSE
  30  ;   WHILE NOT(ERROR)
  31  ;     ACCESS
  32  ;     SEND PRIORITY
```

```
33 ;       SEND TRANACTION.HEADER
34 ;       SEND ACCESS.CODE
35 ;    END
36 ;    PSTAT:=POS
37 ; END
38 CONNECT:
39              JSR LNKSTAT         ;LINKED?
40              BPL >1              ;(N)GETON
41              RTS                 ;(Y)RETURN
42 ^1           LDA LITLOC          ;SAVE SCRN CHAR
43              STA LITSAV
44 AGAIN        JSR ACCESS          ;GET ON         --251 ACCESS NET
45              BCC REQUEST         ;GAINED NET
46 ;LOOP IN QUEUE
47 QLOOP        JSR CLROFF          ;CLEAR NET
48              LDA #$11            ;INV'Q'
49              STA LITLOC
50              LDA KEYBRD          ;CTRL-Q ?
51              CMP CTRLQ
52              BEQ QUITX           ;(Y)EXIT
53              BNE AGAIN           ;(N)TRY AGAIN
54 ;ACCESS BYTE:
55 ;     BIT 7 - FEED INFO
56 ;     BIT 6 - SIGNON (ID, WHATEVER)
57 ;     BIT 5 - FEED
58 ;     BIT 4 - FMGR
59 ;     BIT 3 - RWTS
60 ;ACCESS SUCCESSFUL !!!
61 REQUEST:
62              LDA ACCBYTE         ;ACCESS TYPE    -TRANSACT TYPE
63              JSR SIMLWRO
64              BCS QLOOP           ;FAILED
65 ;ACCESS GAINED
66              LDA #$20            ;LIGHT ON
67              STA LITLOC
68              LSR                 ;RETURN POS
69              RTS
70 ;
71 ; DOS GOING?
72 ;
73 ; IF NOT(BSY) OR TIMEOUT(SUSPND)
74 ;    THEN LINK ERROR
75 CHKSUS:
76              JSR LNKSTAT         ;HOST BUSY?
77              BPL ACCERR          ;(N)LOST NET
78              RTS                 ;(Y)IN PROCESS
79 ACCERR       PLA
80              PLA                 ;CLEAN STACK
81              JMP LNKERR          ;WHATS WRONG
82 ;
83 ; WAIT ON HOST FOR DATA
84 ;
85 ; REPEAT
86 ;    IF NOT(BSY) THEN LINK.ERROR
87 ; UNTIL DATAREADY
88 ; IF TIMEOUT THEN LINK.ERROR
89 ; END
90 WAITNET:
91              LDX #$00            ;CLR ERR COUNT
92 ^1           JSR LNKSTAT         ;HOST BUSY?
93              BPL ACCERR          ;(N)LOST NET
94              JSR CHKDATA         ;(Y)DATA YET?
95              BMI >2              ;(N)WAIT COUNT
```

```
96              RTS                    ;(Y)RETURN
97      ^2      DEX
98              BNE <1                 ;TIME OUT?
99              BEQ ACCERR             ;NO DATA, HOST LOST
100             TTL "AROS 2.20/1 REMOTE FILE MGR"
101  ;****
102  ;***
103  ;**
104  ;*   FILE MANAGER EMULATION DRIVERS
105  ;**
106  ;***
107  ;****
108  ;
109  ; SEND FILE MANAGER PARAMETERS              -DOS I/O BLOCK
110  ;
111  ; SEND COMMAND.FLAGS
112  ; SEND PARAMETERS
113  ; C:= ERROR.FLAG
114  ; END
115  SNDPARL    LDA CMDFLG         ;SEND FLAGS     -261/259 I/O BLOCK
116             JSR SIMLWR         ;               -    CALL DRIVER
117             BNE ACCERR         ;               -    FATAL MISMATCH
118             LDY #$0A
119  OUTPARL    LDA PATEMP,Y       ;PARAMETERS
120             JSR SIMLWR         ;               -    CALL DRIVER
121             BNE ACCERR         ;               -    FATAL MISMATCH
122             DEY
123             BPL OUTPARL
124             RTS
125  ;
126  ;
127  ; GET FILE MANAGER PARAMETERS,
128  ; PROCESSER STATUS AND FILE NAME BACK
129  ;
130  ; WAIT.FOR.DATA
131  ; READ RTNSTAT.CODE
132  ; READ PARAMETERS
133  ; IF ERROR THEN LINK.ERROR
134  ; A:=PARTNC
135  ; END
136  ;GET RETURN STATUS CODE
137  ; BIT/FUNCTION
138  ;   7  CARRY SET (ERROR)
139  ;   6  PUBLIC OR EXPLICIT FILE
140  GETPARL    JSR SIMLRD
141             BCS ACCERR
142             STA RTNSTAT
143             LDY #$0A
144  INPARL     JSR SIMLRD
145             BCS ACCERR
146             STA PATEMP,Y
147             DEY
148             BPL INPARL
149             LDA PARTNC         ;RETURN ERROR
150             RTS                ; CODE IN A
151  ;
152  ; SEND AND RECEIVE ANY STANDARD FM CALL
153  ;
154  ; SEND PARAMETERS
155  ; IF FAIL THEN RESTART
156  ; WAIT.FOR.DATA
157  ; READ PARAMETERS
158  ; IF ERROR THEN LINK.ERROR
```

```
159 ; END
160 ANYCALL   JSR CONNECT      ;ACCESS CENTRAL-252 CALL ACCESS
161           JSR SNDPARL      ;SEND COMMAND   -259 SEND I/O BLOCK
162           JSR SNDNAME      ;SEND FILE NAME-259 SEND FILENAME
163           LDA CSTATE       ;CHECK RESULT   -260 COLLISION?
164           BEQ OKCALL       ;ALL OK              CONTINUE
165           JSR CHKRNG       ;                -262 MERGEABLE?
166           BNE NOKCALL      ;                    NOT MERGEABLE
167 OKCALL    JSR WAITNET      ;FOR DATA
168           JSR RDBLOCK      ;GET DATA  -261/263 EXTRACT DATA
169           JMP GETPARL      ;GET PARL & RTN-    RETURN STATUS
170 ;
171 NOKCALL   JMP ACCERR       ;RESTART      -     RETRY ACCESS
172 ;
173 ; RE-OPEN A FILE
174 ;
175 ; IF NETFLG THEN END
176 ; CMDFLG:=CMDFLG+WASTATF
177 ; PARL:=OPEN
178 ; NAME:=WANAME
179 ; SEND ANYPARL
180 ; IF ERROR THEN FMGR.ERROR
181 ; END
182 GETFILE   BIT NETFLG
183           BPL GETFL1       ;LINKED?
184           RTS              ;(Y)FILE IS ALREADY OPEN
185 GETFL1    LDA CMDFLG       ;MODIFY COMMAND
186           EOR WASTATF      ; FLAGS FROM WA
187           STA CMDFLG       ; STATUS
188           LDX #$06
189 GETFL2    LDA WAOPEN,X     ;RETRIEVE ORG
190           STA PATEMP,X     ; OPEN FROM WA
191           DEX
192           BPL GETFL2
193           JSR NAM3         ;WA FILE NAME
194           JSR ANYCALL
195           BEQ GETFL3       ;ERROR?
196           JMP ERROR        ;(Y)
197 GETFL3    RTS              ;(N)RETURN
198 ;
199 ; SEND ANY OLD WRITES
200 ;
201 ; IF NOT(WROLD) THEN END
202 ; GETFILE
203 ; PARL:=OLDWR
204 ; FLUSH.DATA:=TRUE
205 ; SEND WRITE
206 ; END
207 OLDWR     LDA WROLD        ;ANY WRITES?
208           BEQ OLDWR3       ;(N)RETURN
209           JSR GETFILE      ;OPEN FILE
210           LDX #$07
211 OLDWR1    LDA WROLD,X      ;RETRIEVE WR
212           STA PATEMP,X     ; FROM WA
213           DEX
214           BPL OLDWR1
215           LDA #$80         ;WRITE, FLUSH
216           STA WAFLAGS      ; MOVE
217           JMP OLDWR2       ;FAKE WRITE
218 OLDWR3    RTS
219 ;
220 ; CATALOG
221 ;
```

```
222 CATLOG    LDA FMSLOT         ;SLOT NUM
223           ORA #$B0
224           STA CATSLT
225           LDA FMDRIVE        ;DRIVE NUM
226           ORA #$B0
227           STA CATDRV
228           LDX #$11
229 PRHDR     LDA CATHDR,X
230           JSR OUTSCR         ;PRINT
231           DEX
232           BPL PRHDR
233           JSR PNTDAB         ;PNT BUFFER
234 ;
235           JSR CATCON         ;CAT SUBRTN
236 ;
237           PHP                ;SAVE ERR FLG
238           LDA FMRTNC
239           STA PARTNC         ;ERR CODE
240           JMP ERREXT         ;EXIT
241 ;
242 CATHDR    HEX 8D
243 CATDRV    HEX 00
244           DCI " EVIRD ,"
245 CATSLT    HEX 00
246           DCI " TOLS"
247           HEX 8D8D
248 ;
249 ; SIMPLE COMMANDS
250 ; OPEN/DELETE/UNLOCK/LOCK/RENAME/VERIFY
251 ;
252 ; WORKAREA:=NULL
253 ; NAME:=NAME1
254 ; SEND ANYPARL
255 ; IF ERROR THEN FMGR.ERROR
256 ; IF OPEN
257 ;    THEN
258 ;       WORKAREA:=PARL
259 ;       FILELOCK:=FALSE
260 ;       CURRENT.BUFFER:=NULL
261 ;       FILE POINTER:=0
262 ;       WROLD:=NULL
263 ;       IF PRIVATE
264 ;          THEN
265 ;             WATAGS:=SYSTEM.TAGS
266 ;             WASTATF:=PRIVATE
267 ;          ELSE
268 ;             WATAGS:=NULL
269 ;             WASTATF:=PUBLIC
270 ;       IF TEXT.FILE THEN UNLINK
271 ;       SAVE.WORKAREA
272 ; END
273 COMMON    JSR CLRWAB
274           JSR NAM1
275           JSR ANYCALL        ;SEND/GET PARL
276           LDA PATEMP         ;GET COMCCND
277           CMP #$01           ;OPEN?
278           BEQ OPEN           ;(Y)
279 COMMON1   LDA PARTNC         ;(N) RETURN
280           JMP EXIT           ; ERROR IF ANY
281 OPEN      LDA RTNSTAT        ;REAL ERROR?
282           BMI COMMON1        ;(Y)EXIT
283 ;(N)SETUP WA
284           LDA PATRGH         ;FILE TYPE
```

```
285              AND #$7F            ;CLR LOCK BIT
286              STA PATRGH          ;SAVE FILE TYPE
287              BNE OPEN1           ;TEXT FILE?
288              JSR CLROFF          ;(Y)SIGN OFF
289 OPEN1        LDX #$06            ;SAVE FMPARL
290 SAVOPN       LDA PATEMP,X        ; IN WA FOR
291              STA WAOPEN,X        ; FUTURE OPENS
292              DEX
293              BPL SAVOPN
294              LDA #$80            ;SET PRIVATE
295              BIT RTNSTAT         ;PRIVATE?
296              BVC SAVOPN1         ;(Y)
297              LSR                 ;(N)SET LIT
298 SAVOPN1      STA WASTATF         ;SAVE STATUS
299              LDA #$00            ;ZERO CURRENT
300              STA FLPSECT         ; FILE POINTER
301              STA FLPSECT+1
302              STA WSFLPO
303              STA OLDWR           ;NO PENDING WR
304              LDA #$FF            ;FLUSH BUFFER
305              STA WACBSL
306              STA WACBSH
307              JSR SAVWAB
308              JMP EXIT
309 ;
310 ; READ
311 ;
312 ; CALC.FILEPOINT
313 ;
314 READ         LDA PASUBC
315              CMP #$05            ;VALID SUBC?
316              BCS ERROR3          ;(N) >4
317              JSR GETFLP          ;CALC FLP
318              BIT WAFLAGS         ;CHECK FLAGS
319              BMI GODISK          ;MULTI-SECTOR READ
320              BVS GODISK          ;EXTERNAL BUFF
321 ;GET THE DATA FROM BUFFER
322              LDA #$40            ;READ, NO FLUSH
323              STA WAFLAGS
324 READ1        JSR MOVE
325              LDA #$00            ;NO ERRORS
326              STA RTNSTAT
327              STA PARTNC
328              JMP GODISK6
329 ;
330 ; WRITE
331 ;
332 WRITE        LDA PASUBC
333              CMP #$05            ;VALID SUBC?
334              BCS ERROR3          ;(N) >4
335              JSR GETFLP          ;CALC FLP
336              BIT WAFLAGS         ;CHECK FLAGS
337              BVS GODISK          ;EXTERNAL BUFF
338              BMI GODISK1         ;MULTI-SECTOR WRITE
339 ;(SAME BUFFER, DON'T PRE-WRITE)
340 ;WRITE DATA TO BUFFER
341              LDA #$00            ;WRITE,
342              STA WAFLAGS         ; NO FLUSH
343              LDX #$07            ;SAVE OLD WRITE
344 WRITE1       LDA PATEMP,X
345              STA OLDWR,X
346              DEX
347              BPL WRITE1
```

```
348             BMI READ1           ;ALWAYS
349 ;
350 ;
351 ; POSITION
352 ;
353 POSTN   JSR GETWAB          ;GET WAB
354         JSR CALCFP          ;CALCULATE FP
355         JMP GODISK6         ;RD/WR EXIT
356 ;
357 ; PROCESS READ/WRITE
358 ;
359 GODISK  JSR OLDWR
360 GODISK1 LDA PATEMP          ;SET FLAGS
361         LSR
362         ROR WAFLAGS         ;B6=READ
363         ROR WAFLAGS         ;B7=FLUSH MOVE
364         JSR GETFILE         ;OPEN FILE
365         LDX #$0A            ;MOVE FM TO PA
366 GODISK2 LDA FMPL,X
367         STA PATEMP,X
368         DEX
369         BPL GODISK2
370         LDA #$04            ;ALL CALLS ARE
371         STA PASUBC          ; POS/RANGE
372         JSR CALCREC         ;GET CORRECT REC&OFFSET
373 OLDWR2  JSR SNDPARL         ;SHIP IT
374 GODISK3 JSR BUFFIN
375         JSR MOVE
376         BIT WAFLAGS         ;CHECK FLAGS
377         BVS GODISK4         ;READ?
378         JSR BLOKWR          ;(N)SEND BUFF
379 GODISK4 LDA PARNGL          ;DONE (RNG=0)?
380         ORA PARNGH
381         BNE GODISK3         ;(N)NEXT BUFF
382         BIT WAFLAGS         ;CHECK FLAGS
383         BPL GODISK5         ;MOVE FLUSHED?
384         RTS                 ;(Y)RETURN
385 GODISK5 JSR SIMLRD          ;ERROR CODE
386         JSR GETPARL
387         LDA #$00            ;CLR OLD WRITE
388         STA WROLD
389 GODISK6 JSR CALCREC         ;REC&OFF FROM
390 ; CURRENT FP
391         LDX #$03
392 GODISK7 LDA PARECL,X        ;RETURN UPDATED
393         STA FMREC,X         ; RECORD NUMBER
394         DEX                 ; AND OFFSET
395         BPL GODISK7
396         JSR SAVWAB          ;SAVE WA
397         JMP EXIT
398 ;
399 ; READ BUFFER (MAYBE)
400 ;
401 BUFFIN  JSR WAITNET
402         JSR SIMLRD          ;ERROR?
403         BNE BUFFERR         ;(Y)DIE
404         LDA WAFLAGS         ;FLUSH DATA?
405         BMI BUFFIN1         ;(Y)NO READ
406         LDA PATEMP          ;SAVE PATEMP ON
407         PHA                 ; STACK
408         LDA FLPSECT         ;DOES CURRENT
409         EOR WACBSL          ; BUFFER=REL
410         STA PATEMP          ; SECTOR OFFSET
```

```
411          LDA FLPSECT+1
412          EOR WACBSH
413          ORA PATEMP
414          TAX                    ;RESULT IN X
415          PLA                    ;RESTORE PATEMP
416          STA PATEMP
417          TXA
418 BUFFIN1  JSR SIMLWR
419          CMP #$00               ;READ?
420          BNE BUFFIN2            ;(N)RETURN
421          JSR BLOKRD
422 BUFFIN2  RTS
423 ;
424 ; BUFFER ERROR
425 ;
426 BUFFERR  PLA                    ;CLEAR RTN ADR
427          PLA
428          JSR GETPARL            ;READ RTN PARL
429          JMP ERRORS             ;ERROR EXIT
430 ;
431 ; GET BUFFER ADDRESS AND RANGE OF R/W
432 ;
433 GETFLP   JSR GETWA              ;GRAB WA
434          LDA PASUBC
435          CMP #$03               ;POSITION?
436          BCC GETFLP1            ;(N)
437          JSR CALCFP             ;(Y)GET NEW FLP
438 GETFLP1  LDA #$01
439          BIT PASUBC             ;RANGE?
440          BEQ GETFLP2            ;(N)
441          AND PATEMP
442          STA FMRANGE            ;RD RNG=1
443          LDA #$00               ;WR RNG=0
444          STA FMRANGE+$1
445          LDA #FMBYTE            ;DESTINATION=
446          STA WADESL             ; FMPL
447          LDA #FMBYTE+1
448          STA WADESH
449          BNE GETFLP3            ;ALWAYS
450 GETFLP2  LDA FMADR              ;SAVE DESTIN
451          STA WADESL
452          LDA FMADR+$1
453          STA WADESH
454 GETFLP3  LDA FLPSECT            ;START IN SAME
455          EOR WACBSL             ; SECTOR ?
456          STA WAFLAGS
457          LDA FLPSECT+1
458          EOR WACBSH
459          ORA WAFLAGS
460          BEQ GETFLP4            ;(Y)
461          LDA #$80               ;(N) STORE FLAG
462          STA WAFLAGS
463 GETFLP4  CLC
464          LDA FMRANGE            ;CROSS BUFFER
465          ADC FLPBYTE            ; PAGE BOUNDRY?
466          ROR WAFLAGS
467          RTS
468 ;
469 ; CLOSE
470 ;
471 CLOSE    JSR GETWAB
472          LDA WASTATF            ;LOCKOUT?
473          AND #$0C
```

```
474               BNE  CLOSE1          ;(Y)UNLOCK
475               LDA  WROLD           ;OLD WRITE?
476               BNE  CLOSE1          ;(Y)COMPLETE
477               BEQ  CLOSE2          ;(N)/(N) EXIT
478 CLOSE1        JSR  NAM3            ;NAME IN WA
479               LDA  FNCHAR          ;REPLACE 1ST
480               LDY  #$00            ; CHAR
481               STA  (NAMEP),Y
482               LDA  WASTATF         ;REMOVE LOCKOUT
483               AND  #$F3            ; FLAG
484               STA  WASTATF
485               JSR  GETFILE         ;OPEN FILE
486               JSR  OLDWR           ;FINISH WRITE
487               JSR  CPYPARL         ;GET FM CLOSE
488               JSR  SNDPARL         ;SEND CLOSE
489               JSR  CHKSUS          ;VERIFY NET
490               JSR  WAITNET
491               JSR  GETPARL         ;RETURN PARL
492               JSR  NAM3            ;ZERO NAME
493               LDA  #$00
494               TAY
495               STA  (NAMEP),Y
496 CLOSE2        JMP  EXIT
497 ;
498 ;
499 ; FILE LOCKOUT
500 ;
501 LOCKOUT       JSR  GETWAB          ;GET WA
502               LDA  WASTATF         ;SET LOCK-OUT
503               ORA  #$08            ; FLAG IN STAT
504               STA  WASTATF
505               JMP  SAVWAB          ;SAVE, EXIT
506 ;
507 ;
508 ; FILENAME SUBROUTINES
509 ;
510 NAM1          LDX  PABNAL          ;NAME PNTR
511               STX  NAMEP
512               LDX  PAXNAH
513               STX  NAMEP+1
514               RTS
515 ;
516 NAM2          LDX  FMNAM1          ;RENAME PNTR
517               STX  NAMEP
518               LDX  FMNAM1+$1
519               STX  NAMEP+1
520               RTS
521 ;
522 NAM3          LDX  WANAML          ;WA NAME
523               STX  NAMEP
524               LDX  WANAMH
525               STX  NAMEP+1
526               RTS                  ;NAME ALWAYS OK
527 ;
528 SNDNAME:
529               LDA  #$00
530               STA  NAMERR+1
531               LDY  #$19            ;CHECK LAST 4
532 SNDNAM1       INY                  ; CHARS FOR
533               LDA  (NAMEP),Y       ; LETTERS
534               CMP  SPACE           ;TOO LONG?
535               BEQ  >1              ;(N)SKIP
536               LDA  #$0D            ;NAME TOO LONG
```

```
537             STA NAMERR+1         ;STORE ERR
538 ^1          CPY #$1D             ;LAST CHAR?
539             BNE SNDNAM1          ;(N)NEXT
540 NXTNAM      LDA (NAMEP),Y
541             JSR SIMLWR
542             BCS ERROR6
543             DEY
544             BPL NXTNAM
545 NAMERR      LDA #$00             ;RESULT FLAG
546             BNE >2
547             RTS
548 ;NAME TOO LONG
549 ^2          JMP ERRORS           ;EXIT ERROR
550 ;
551 ERROR6      JMP ACCERR
552 ;
553 ;COPYRIGHT 1983 BY SWI INTL SYS
554 ;END OF FILE
555             ICL "AROS2."
```

APPENDIX C

```
L  1            TTL "HG NETWORK DRIVERS"
   2 ;FILE:HGDRIVERS.
   3 ;PROG: D NERING
   4 ;      J BUCANEK
   5 ;DATE:11-AUG-83
   6 ;
   7 ;****************************************
   8 ;****************************************
   9 ;
  10 ; MERCURY TRANSMIT/RECEIVE AND
  11 ; SYNCRONIZATION DRIVERS
  12 ;
  13 ; COPYRIGHT 1983 BY SWI INTL SYS
  14 ;
  15 ;****************************************
  16 ;****************************************
  17 ;
  18 ;========================================
  19 ;
  20             ORG $BB00
  21 ;
  22 ;========================================
  23 ;
  24 ; HG CARD FUNCTIONS
  25 ;
  26 DATAREG     EQU $COC0
  27 PHANTOM     EQU $COC2
  28 BUSYLIN     EQU $COC3
  29 TIMER       EQU $COC6
  30 TIMSET      EQU $COC7
  31 IDCODE      EQU $COC8
  32 STATUS      EQU $COC9
  33 WRMODE      EQU $COCA
  34 WRLATCH     EQU $COCB
  35 RDMODE      EQU $COCC
  36 RDLATCH     EQU $COCD
  37 IRQMODE     EQU $COCE
  38 CLRCARD     EQU $COCF
  39 ;
  40 ; ENTRY TABLE
  41 ;
```

```
42              JMP ACCESS
43              JMP SUSPND
44              JMP SIMLRD
45              JMP SIMLWR
46              JMP CLROFF
47              JMP SUSPRD
48              JMP TIMEWR
49              JMP RDCHNG
50              JMP WRCHNG
51              JMP LNKFLG
52 ;------------------------------
53 ;
54 ; ACCESS LEVEL PARAMETERS               -FIG.3B
55 ;
56 ;   MASKING DATA TABLE                  - LEVEL I
57 ;
58 MASKTBL:
59 OVERIDE    HEX 00           ;PRIORITY OVERRIDE
60            HEX 00
61 PRIVLG     HEX 00           ;ROTATING PRIORITY
62            HEX 00
63 SUBPRIV    HEX 00           ;SUB-PRIORITY
64 SRCNODE    HEX 01           ;SOURCE ADDRESS
65 EXTNODE    HEX 00           ;EXTERNAL ADDRESS
66 DSTNODE    HEX 00           ;OBJECT ADDRESS
67 ;
68 ;   TVH DATA BLOCK                      - LEVEL II
69 ;
70 TVHTBL:
71            HEX 04           ;STANDARD APPLE
72            HEX 01           ;DOS COMMAND
73 RWSTATE    HEX 00
74 ;
75 CSTATE     HEX 00           ;FLAG
76 MONITOR    HEX 00           ;FLAG
77 ;------------------------------
78 ;
79 ; WAIT FOR FREE NETWORK              -SUBROUTINE TO CHECK
80 ;                                    -FOR FREE NETWORK
81 CRKBSY     JSR CLROFF       ;RESET CARD
82            LDX #$00
83 CKBSY0     LDA #$03         ;(00000011)
84            AND STATUS
85            STA CLRCARD
86            BEQ CKBSY1
87            DEX
88            BNE CKBSY0
89            SEC
90            RTS
91 CKBSY1     LDA #$02         ;(00000010)
92            LDX #$20
93 CKBSY2     AND STATUS       ;WATCH MASK
94            STA CLRCARD
95            BEQ CKBSY3       ;SOMEONE ELSE?
96            DEX
97            BNE CKBSY2
98 CKBSY3     STA WRMODE       ;SET MASK MODE
99            SEC
100           ROR RWSTATE      ;SET WR STATUS
101 CKBSY6    CLC
102           RTS
103 ;------------------------------
```

```
104 ;
105 ; GENERAL NETWORK LOG ON                    -FIG. 4C & 4D
106 ;
107 ; RETURN FLAGS:
108 ;   C=NET BUSY AFTER 4096 TRIES/NO NET
109 ;   Z=ACCESS COLLISION
110 ;
111 ACCESS    LDY #$10              ;TIGHT TRY 16X
112 ACCSS0    JSR CRKBSY            ;                 -251 ACCESS NET
113           BCC ACCSS1            ;NET AQUIRED    -     SUCCESS
114           DEY
115           BNE ACCSS0            ;               -     TRY AGAIN
116           LDX #$FF
117           RTS                   ;C=1:Z=0 (BUSY)-     FAILURE
118 ; SEND ACCESS HEADER BLOCK                  -252 ACCESS HEADER
119 ACCSS1    LDY #$00
120           STY MONITOR           ;NORMAL MODE
121           STY CSTATE            ;CLEAR FLAG    -321 RESET CSTATE
122 ACCSS2    LDA MASKTBL,Y         ;SEND MASK TBL -     GET DATA
123           JSR SIMLWR            ;              -322 SEND DATA
124           BCS DEFNET            ;LINK ERR      -     LOST NET
125           BVC ACCSS3            ;ALL OK        -323 COLLISION?
126           STA PHANTOM           ;              -324 COMPARISON
127           SEC
128           ROR CSTATE            ;OPPS, SORRY!  -324 SET CSTATE
129 ACCSS3    INY                   ;              -325 NEXT COUNT
130           CPY #$08              ;TBL SENT?     -326 END OF COUNT?
131           BNE ACCSS2            ;              -     NEXT BYTE
132           LDA CSTATE            ;COLLISION?    -327 CHECK RESULT
133           STA MONITOR           ;STORE FLAG    -     STORE RESULT
134 ;   ZERO     = ACCESS WINNER              -253 NO COLLISION, COMPARISON
135 ;   NON-ZERO = COMPARISON & MONITOR       -254 MONITOR NODE
136           BEQ ACCSS4            ;ALL OK        -253 NO COLLISION
137           STA BUSYLIN           ;SET BUSY      -     SKIP IF LOSER
138 ACCSS4    LDA #$96              ;SEND SYNC
139           JSR SIMLWR
140           BNE FAILED            ;WRONG!
141 ; SEND TVH BLOCK                            -255/256 SEND TVH
142           LDY #$00
143           STY CSTATE            ;CLEAR FLG     -321 RESET CSTATE
144 TVHDR1    LDA TVHTBL,Y          ;SEND TVH      -     GET DATA
145           JSR SIMLWR            ;              -322 SEND DATA
146           BCS FAILED            ;LOST NET
147           BVC TVHDR2            ;COLLISION?    -323 COLLISION?
148           STA PHNTOM            ;(Y)           -324 COMPARISON
149           SEC
150           ROR CSTATE            ;              -     SET CSTATE
151 TVHDR2    INY                   ;              -325 NEXT COUNT
152           CPY #$02              ;END?          -326 LAST COUNT?
153           BNE TVHDR1            ;(N)MORE       -     NEXT BYTE
154           LDA CSTATE            ;CHECK RESULT  -327 COLLISION?
155           BNE FAILED            ;LOST          -257 FATAL MISMATCH
156 ; SEND I/O BLOCK          ;                  -261/259 TRANSACTION
157           JSR TRANSCT           ;CONTINUE
158           LDA CSTATE            ;CHECK RESULT  -260 COLLISION?
159           BEQ IOBLK1            ;ALL OK        -     WINNER
160           JSR CHKRNG            ;SUBSET?       -262 MERGEABLE?
161           BNE FAILED            ;LOST          -NOT MERGEABLE
162 ;
163 ; EXIT MERGEABLE                            -263 EXTRACT DATA
164           LDX #$FF
165           CLC
166           RTS
```

```
167 ;
168 ;   EXIT OK TO CALLER                              -261 TRANSACTION OK
169 IOBLK1    LDX #$00
170          CLC
171          RTS
172 ;
173 ;   FATAL COLLISION
174 ;   CLEAR AND INC PRIORITY
175 ;
176 FAILED   JSR CLROFF              ;CLEAR NET
177          INC PRIVLG              ;HIGHER        -    MODIFY
178          BNE FAIL1               ;PRIORITY      -    PRIORITY LEVEL
179          INC PRIVLG+1
180 FAIL1    CLC
181          LDX #$FF                ;ERR FLAG      -    RETURN ERROR
182          RTS                     ;C=0:Z=0 (COLLSN)
183 ;
184 DEFNET   SEC
185          LDX #$00
186          RTS                     ;C=1:Z=0 (NO REPLY)
187 ;*****************************************
188 ;
189 ; HARDWARE DRIVERS
190 ;
191 ;-----------------------------------------
192 ;
193 ; SWITCH TO RECEIVE
194 ;
195 RDCHNG   BIT RWSTATE             ;CHECK STATE
196          BPL RDCHG2              ;OK
197          LDA #$4B                ;JAMES' SYNC
198          JSR SIMLWR
199          BNE ERROUT              ;ERROR?
200          LDA #$2D                ;DOUG'S SYNC
201          STA WRLATCH             ;(TIGHT SEND)
202          JSR TIMEUP
203          LDX #$10
204 RDCHG1   DEX                     ;WAIT 80 US
205          BNE RDCHG1
206          LDA BUSYLIN             ;RELEASE BSY
207          STA RDMODE              ;SWITCH TO RD
208          ASL IDCODE              ;HAND OFF OK?
209          BCC ERROUT              ;(N)
210          LDA RDLATCH             ;CLEAR COUNT
211          LSR RWSTATE             ;SET RD STATE
212 RDCHG2   CLC
213          RTS
214 ;
215 ; SWITCH TO TRANSMIT
216 ;
217 WRCHNG   BIT RWSTATE             ;CHECK STATE
218          BMI WRCHG2              ;OK
219          JSR TIMEUP              ;WAIT FOR BYTE
220          LDA RDLATCH             ;CHECK 1ST HALF
221          CMP #$4B
222          BNE ERROUT
223          JSR TIMEUP
224          LDA DATAREG             ;CHECK 2ND HALF
225          CMP #$2D
226          BNE ERROUT
227          STA BUSYLIN             ;TAKE BATON
228          STA WRMODE              ;SWITCH TO WR
229          LDX #$20
```

```
230 WRCHG1    DEX                      ;WAIT 160 US
231           BNE  WRCHG1
232           SEC
233           ROR  RWSTATE             ;SET WR STATE
234 WRCHG2    CLC
235           RTS
236 ;
237 ; STATUS BYTE TIMEOUT
238 ;
239 TIMEUP    LDX  #$00                ;COUNT
240 TIMUP1    BIT  STATUS              ;DATA?
241           BMI  TIMUP2              ;(N)
242           RTS
243 ;
244 TIMUP2    DEX
245           BNE  TIMUP1
246           PLA                      ;CLEAN STACK
247           PLA
248 BADNET    JSR  CLROFF
249           SEC                      ;ERR FLAG
250           RTS
251 ;
252 ;   RESET NET DEVICE                             -SUBROUTINE TO
253 ;   RESET DRIVER STATUS                          -CLEAR NET STATE
254 ;
255 CLROFF    STA  CLRCARD             ;CLEAR NET
256           LSR  RWSTATE             ;RD STATE
257           RTS
258 ;
259 ;   RECEIVE A BYTE                               -SUBROUTINE TO
260 ;   RETURN C=0=OK - DATA IN AREG                 -RECEIVE DATA BYTE
261 ;          C=1=ERR - NET CLEARED                 -FIG.4B
262 ;
263 SIMLRD    BIT  STATUS              ;DATA READY?
264           BPL  SIMRD1              ;(Y)SKIP WAIT
265           JSR  TIMEUP              ;(N)WAIT
266 SIMRD1    BIT  IDCODE              ;VALID NET?
267           BPL  ERROUT              ;(N)LOST IT
268           LDA  RDLATCH             ;GET DATA
269           CLC                      ;C=0=NO ERR
270           RTS
271 ;
272 ;   TRANSMIT A BYTE                              -SUBROUTINE TO
273 ;   RETURN C=0=OK - COLLISION IN VBIT            -SEND DATA BYTE
274 ;          C=1=ERR - NET CLEARED                 -FIG.4A
275 ;
276 SIMLWR    BIT  STATUS              ;(TIMER)
277           BIT  IDCODE              ;NET VALID?
278           BPL  ERROUT              ;(N)LOST IT
279           STA  WRLATCH             ;(Y)PUT DATA
280           JSR  TIMEUP
281           CLC
282           BVS  SIMWR1              ;CHK COLLSN
283           LDX  #$00                ;OK
284           RTS                      ;C=0:Z=1
285 SIMWR1    LDX  #$FF
286           RTS                      ;C=0:Z=0
287 ;
288 ;   WAIT FOR DATA OR LINK LOSS
289 ;   RETURN C=0=OK - DATA IN AREG
290 ;          C=1=ERR - NET CLEARED
291 ;
292 SUSPND    BIT  STATUS              ;DATA?(TIMER)
```

```
293             BMI SUSPND             ;(N)LOOP
294             BIT IDCODE             ;(Y)VALID NET?
295             BPL BADNET             ;(N)LOST IT
296             LDA RDLATCH            ;(Y)GET DATA
297             CLC
298             RTS
299 ;
300 ;   CHECK NET LINK STATUS
301 ;   RETURN N=1=LINKED
302 ;          N=0=UNLINKED
303 ;
304 LNKFLG      BIT STATUS             ;CLEAR TIMER
305             BIT IDCODE             ;CHECK FLAG
306             RTS
307 ;
308 ;COPYRIGHT 1983 BY SWI INTL SYS
309 ;END OF FILE
310             END
A
```

We claim:

1. A computer network comprising:

(a) a bus, including a bus conductor;

(b) a plurality of processors coupled to said bus, some or all of which processors contend for control of said bus in order to transmit transmission header information, including priority header information followed by transaction header information, via said bus to a destination address, said priority header information in each of said processors including a plurality of bits arranged as priority code;

(c) data asserting means in each of said processors causing said contending processors to each concurrently assert corresponding bits of their respective priority codes on said bus in order of decreasing bit significance, such that if any of said corresponding priority code bits is at a first logic level, said first logic level appears on said bus conductor and otherwise a second logic level appears on said bus conductor;

(d) priority bit reading means in each of said processors for causing each contending processor to read the priority bit logic levels appearing on said bus conductor;

(e) priority bit comparing means in each of said processors for causing each contending processor to compare the logic levels of the bits of its priority code to corresponding logic levels of bits read on said bus conductor in order of decreasing bit significance to detect the occurrence of any data mismatches therebetween;

(f) mismatch data gating means in each of said processors for causing any of said contending processors for which a data mismatch is detected to immediately stop asserting further bits of its transmission header information;

(g) transaction data transmission means in each of said processors for causing a highest priority one of said contending processors which does not detect a data mismatch during transmission of its priority header information to transmit its transaction header information on said bus;

(h) transaction header reading and comparing means for causing each other one of said contending processors to read the bits of data of said transaction header information transmitted by said highest priority contending processor on said data bus and compare those bits with respective corresponding bits of the transaction header information of that contending processor to detect any mismatches therebetween; and (i) mergeability determination means in each of said processors responsive to said transaction header reading and comparing means for causing each of said other ones of said contending processors to determine, in response to its comparing of its own transaction header information with that transmitted on said bus by said highest priority contending processor, whether a first transaction specified by the transaction header information of that contending processor can be merged with a second transaction specified by the transaction header information of said highest priority contending processor.

2. The computer network of claim 1 including merging means in each of said processors responsive to said mergeability determination means therein for causing that processor to read all of the data appearing on said data bus during said second transaction.

3. The computer network of claim 2 including priority modification means in each of said contending processors for modifying the priority code of that contending processor before that contending processor can contend for said bus.

4. The computer network of claim 3 wherein each of said processors includes a computer and an interface circuit coupling that couples that computer to said bus, said bus including a bidirectional serial data bus including said bus conductor, a ready signal conductor, and an acknowledge signal conductor, and a busy signal conductor.

5. The computer network of claim 4 wherein said interface circuit includes shift register circuit means for transferring data in parallel format between said interface circuit and said computer and for effectuating transfer of data in serial format between said bus conductor and said interface circuit.

6. The computer network of claim 5 wherein said interface circuit includes local station address means for storing a permanent local address code of said processor and address comparison means coupled to said shift register circuit means and said local address means for producing a predetermined signal if an address code that has been input into said shift register circuit means from said bus conductor matches said local address code.

7. The computer network of claim 6 wherein said interface circuit includes comparison circuit means for sequentially comparing corresponding bits of transmission header information written into said shift register circuit means by said computer and transmission header information appearing on said bus conductor and producing a mismatch signal in response to a mismatch between said corresponding bits, and storage means responsive to said comparison circuit means and coupled to said computer for storing information indicative of the occurrence of said mismatch and gating circuit means coupled to said storage means, said bus conductor and said shift register circuit means for preventing any data having said first logic level from being asserted by that contending processor onto said bus conductor.

8. The computer network of claim 7 wherein said interface circuit includes handshaking logic circuit means coupled to said bus conductor, said busy signal conductor, said Ready signal conductor, said Acknowledge signal conductor, said shift register circuit means, and said storage means for effectuating handshaking operations to synchronize transfer of said transmission header information on said bus conductor.

9. A method of operating a computer network including a bus and a plurality of processors, some or all of which contend for control of said bus in order to transmit transmission header information, including priority header information followed by transaction header information, via said bus to a destination address, said priority header information in each of said processors including a plurality of priority bits arranged as a priority code, said method comprising the steps of:
(a) causing each of said contending processors to concurrently assert a most significant bit of its priority code on said bus such that if any of said most significant priority code bits is at a first logic level, said first logic level appears on a conductor of said bus and otherwise a second logic level appears on said bus conductor;
(b) causing each contending processor to read the logic level appearing on said bus conductor;
(c) causing each contending processor to compare the logic level of the most significant bit of its priority code to the logic level read in step (b) to determine if a data collision has occurred;
(d) causing any of said contending processors detecting a data collision to stop asserting bits of its transmission header information;
(e) repeating steps (a) through (d) for the remaining bits of said priority codes in order of decreasing bit significance;
(f) causing a highest priority one of said contending processors which does not detect a data collision to transmit its transaction header information on said bus, and also causing each other one of said contending processors to read the bits of data appearing on the bus and compare those bits with respective corresponding bits of the transaction header information of that contending processor to detect any mismatches therewith; and
(g) causing each of said other ones of said contending processors to determine, in response to said comparing of step (f), if a first transaction specified by the transaction header information of that contending processor can be merged with a second transaction specified by the transaction header information of said highest priority contending processor by determining if the data to be conducted on said bus in effectuating said first transaction is identical to or is a subset of the data that would be conducted on said bus in effectuating said second transaction.

10. The method of claim 9 further including the step of causing each of said other ones of said contending processors to determine, in response to said comparing of step (f), if a first transaction specified by the transaction header information of that contending processor is mergeable with a second transaction specified by the transaction header information of said highest priority contending processor by determining if the data to be conducted on said bus in effectuating said first transaction is identical to the data that would be conducted on said bus in effectuating said second transaction.

11. The method of claim 9 including causing said highest priority contending processor to write information onto said bus and read information from said bus as necessary to effectuate performing of said second transaction.

12. The method of claim 11 including causing each of said other ones of said contending processors for which said determining is affirmative to merge said first transaction with said second transaction by continuing to read data appearing on said bus during said second transaction.

13. The method of claim 12 including causing said highest priority contending processor to modify its priority code to a different value.

14. The method of claim 12 including causing each contending processor which does not merge its transaction with said second transaction to modify its priority code to a different value.

15. The method of claim 11 wherein the bits of said transaction header information are serially asserted on said bus conductor.

16. The method of claim 15 wherein said bus includes a pair of handshaking signal conductors for respectively conducting a ready signal responsive to any of said contending processors for indicating when data on said bus conductor is valid and an acknowledge signal generated by the last one of said other contending processors to read data on said bus conductor in response to said ready signal.

17. A method of operating a computer network including a bus and a plurality of processors, some of which are contending for control of said bus in order to transmit transmission header information, including priority header information followed by transaction header information, via said bus to a destination address, said priority header information in each of said processors including a predetermined number of priority bits arranged as a priority code, said method comprising the steps of:
(a) causing each of said contending processors to concurrently assert the most significant bit of its priority code on said bus such that if any of said most significant priority code bits is a first logic level, said first logic level appears on a conductor of said bus, and otherwise a second logic level appears on said bus conductor;
(b) causing each contending processor to read the logic level appearing on said bus conductor;
(c) causing each contending processor to compare the logic level of the most significant bit of its priority code to the logic level read in step (b) to determine if a data collision has occurred;

(d) causing any of said contending processors detecting a data collision to stop asserting bits of its transmission header information;

(e) repeating steps (a) through (d) for the remaining bits of said priority codes in order of decreasing bit significance;

(f) causing a highest priority one of said contending processors which does not detect a data collision to transmit its transaction header information on said data bus, and also causing each other one of said contending processors to read the bits of data appearing on the data bus and compare those bits with respective corresponding bits of the transaction header information of that contending processor to detect any mismatches therewith;

(g) causing each of said other ones of said contending processors to determine, in response to said comparing of step (f) to determine whether a first transaction specified by the transaction header information of that contending processor can be merged with a second transaction specified by the transaction header information of said highest priority contending processor by determining if the data to be conducted on said bus in performing said first transaction is identical to or is a subset of the data that will be conducted on said bus in performing said second transaction;

(h) causing said highest priority contending processor to write information onto said bus and read information from said bus as necessary to effectuate performing of said second transaction;

(i) causing each of said other ones of said contending processors for which the determination of step (g) is affirmative to continue to read data appearing on said bus during said second transaction; and (j) causing said highest priority contending processor to modify its priority code to a different value, and causing each contending processor which does not merge its transaction with said second transaction to modify its priority code to a different value.

* * * * *